US011987060B2

(12) United States Patent
Ito

(10) Patent No.: US 11,987,060 B2
(45) Date of Patent: May 21, 2024

(54) IMAGE FORMING APPARATUS AND IMAGE FORMING METHOD

(71) Applicant: Takayuki Ito, Kanagawa (JP)

(72) Inventor: Takayuki Ito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 97 days.

(21) Appl. No.: 17/902,863

(22) Filed: Sep. 4, 2022

(65) Prior Publication Data

US 2023/0076427 A1 Mar. 9, 2023

(51) Int. Cl.
*B41J 2/21* (2006.01)
*B41J 3/54* (2006.01)

(52) U.S. Cl.
CPC ........... *B41J 2/2132* (2013.01); *B41J 2/2103* (2013.01); *B41J 3/543* (2013.01)

(58) Field of Classification Search
CPC ......... B41J 2/2132; B41J 2/2103; B41J 3/543
See application file for complete search history.

(56) References Cited

U.S. PATENT DOCUMENTS

| | | | |
|---|---|---|---|
| 2009/0179934 A1 | 7/2009 | Takagi et al. | |
| 2019/0283447 A1 | 9/2019 | Yokozawa et al. | |
| 2022/0111659 A1 | 4/2022 | Abe et al. | |

FOREIGN PATENT DOCUMENTS

| | | | |
|---|---|---|---|
| JP | 2001-063014 | 3/2001 | |
| JP | 2002-096455 | 4/2002 | |
| JP | 2005177991 A * | 7/2005 | ............. B41J 2/145 |
| JP | 2006-110958 | 4/2006 | |
| JP | 2020-091913 | 6/2020 | |

* cited by examiner

*Primary Examiner* — Justin Seo
(74) *Attorney, Agent, or Firm* — Duft & Bornsen, PC

(57) ABSTRACT

An image forming apparatus includes a liquid discharge device and processing circuitry. The liquid discharge device includes at least one nozzle group, where N represents an integer, to discharge liquid. The processing circuitry causes the first nozzle group to discharge in a first scan, causes the second nozzle group to discharge in a second scan, and causes the N-th nozzle group to discharge in an N-th scan to form a complete image. The processing circuitry, with respect to an image completion rate indicating a rate of an image formed by each of the first nozzle group to the N-th nozzle group in the complete image, sets the image completion rate of a portion of the first nozzle group adjacent to the second nozzle group in the sub-scanning direction to be not higher than the image completion rate of any one of the second nozzle group to the N-th nozzle group.

13 Claims, 13 Drawing Sheets

IMAGE FORMING APPARATUS AND IMAGE FORMING METHOD

CROSS-REFERENCE TO RELATED APPLICATIONS

This patent application is based on and claims priority pursuant to 35 U.S.C. § 119(a) to Japanese Patent Application No. 2021-146923, filed on Sep. 9, 2021, in the Japan Patent Office, the entire disclosure of which is hereby incorporated by reference herein.

BACKGROUND

Technical Field

Embodiments of the present disclosure relate to an image forming apparatus and an image forming method.

Related Art

A technology is known in the art to control a nozzle discharge rate during scanning in a serial head inkjet printer that forms an image on a non-permeable medium.

For example, a configuration in which discharging of ink from ends of the row of nozzles is thinned out has been proposed to enhance the quality of solid image at the time of printing.

In addition, a configuration has been proposed in which the nozzle discharge amount is controlled to reduce color difference (bi-directional color difference) due to a difference in landing order of color ink droplets between a forward path and a return path of a head

SUMMARY

In an embodiment of the present disclosure, an image forming apparatus includes a liquid discharge device and processing circuitry. The liquid discharge device includes a first nozzle group to an N-th nozzle group, where N represents an integer, each nozzle group including at least one nozzle row in which a plurality of nozzle orifices to discharge liquid of at least one type of process color for image formation are arranged in a sub-scanning direction orthogonal to a main scanning direction. The first nozzle group is arranged most upstream of the first nozzle group to the N-th nozzle group in the sub-scanning direction. A second nozzle group to the N-th nozzle group are arranged downstream from the first nozzle group in order in the sub-scanning direction such that the first nozzle group to the N-th nozzle group do not overlap with each other when viewed from the main scanning direction. The processing circuitry, during movement of the first nozzle group to the N-th nozzle group in the main scanning direction to form an image, causes the first nozzle group to discharge the liquid in a first scan, causes the second nozzle group adjacent to the first nozzle group to discharge the liquid in a second scan after the first scan, and causes the N-th nozzle group adjacent to an (N−1)-th nozzle group to discharge the liquid in an N-th scan after the second scan to form a complete image in a predetermined image area of a recording medium after the N-th scan. The processing circuitry, with respect to an image completion rate indicating a rate of an image formed by each of the first nozzle group to the N-th nozzle group in the complete image, sets the image completion rate of a portion of the first nozzle group adjacent to the second nozzle group in the sub-scanning direction to be equal to or smaller than the image completion rate of any one of the second nozzle group to the N-th nozzle group.

In another embodiment of the present disclosure, an image forming apparatus includes a liquid discharge device and processing circuitry. The liquid discharge device includes a first nozzle group to an N-th nozzle group, where N represents an integer, each nozzle group including at least one nozzle row in which a plurality of nozzle orifices to discharge liquid of at least one type of process color for image formation are arranged in a sub-scanning direction orthogonal to a main scanning direction. The first nozzle group is arranged most upstream of the first nozzle group to the N-th nozzle group in the sub-scanning direction. A second nozzle group to the N-th nozzle group are arranged downstream from the first nozzle group in order in the sub-scanning direction such that the first nozzle group to the N-th nozzle group do not overlap with each other when viewed from the main scanning direction. The processing circuitry, during movement of the first nozzle group to the N-th nozzle group in the main scanning direction to form an image, causes the first nozzle group to discharge the liquid in a first scan, causes the second nozzle group adjacent to the first nozzle group to discharge the liquid in a second scan after the first scan, and causes the N-th nozzle group adjacent to an (N−1)-th nozzle group to discharge the liquid in an N-th scan after the second scan, to form a complete image in a predetermined image area of a recording medium. The processing circuitry, with respect to an image completion rate indicating a rate of an image formed by each of the first nozzle group to the N-th nozzle group in the complete image, sets the image completion rate of a portion of the first nozzle group adjacent to the predetermined image area of the recording medium in the sub-scanning direction to be equal to or smaller than the image completion rate of any one of the second nozzle group to the N-th nozzle group.

In still another embodiment of the present disclosure, an image forming method includes forming, moving, discharging, and setting. The forming forms an image with a liquid discharge device including a first nozzle group to an N-th nozzle group, where N is an integer, each nozzle group including at least one nozzle row in which a plurality of nozzle orifices to discharge liquid of at least one type of process color for image formation are arranged in a sub-scanning direction orthogonal to a main scanning direction, the first nozzle group being arranged most upstream of the first nozzle group to the N-th nozzle group in the sub-scanning direction, a second nozzle group to the N-th nozzle group being arranged downstream from the first nozzle group in order in the sub-scanning direction such that the first nozzle group to the N-th nozzle group do not overlap with each other when viewed from the main scanning direction. The moving moves the first nozzle group to the N-th nozzle group in the main scanning direction to form an image. The discharging discharges the liquid from the first nozzle group in a first scan, discharges the liquid from the second nozzle group adjacent to the first nozzle group after the first scan, and discharges the liquid from the N-th nozzle group adjacent to an (N−1)-th nozzle group in an N-th scan after the second scan to form a complete image in a predetermined image area of a recording medium after the N-th scan. The setting, with respect to an image completion rate indicating a rate of an image formed by each of the first nozzle group to the N-th nozzle group in the complete image, sets the image completion rate of a portion of the first nozzle group adjacent to the second nozzle group in the sub-scanning direction to be equal to or smaller than the image completion rate of any one of the second nozzle group to the N-th nozzle group.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
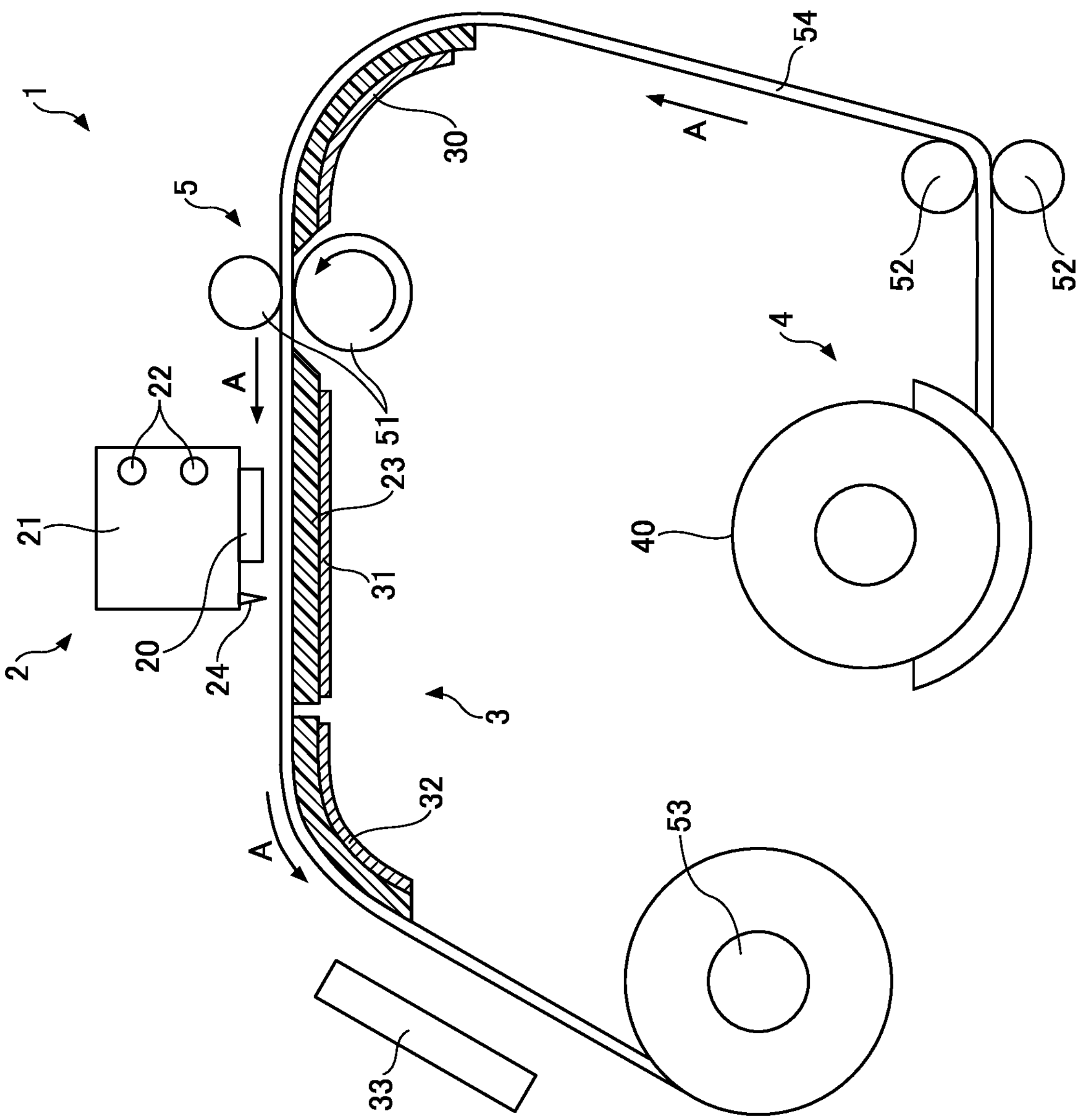
FIG. 1 is a diagram illustrating a configuration of an inkjet recording apparatus, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings. Like reference signs denote like elements as much as possible and overlapping description may be omitted as appropriate to facilitate understanding of the description.

Configuration of Inkjet Recording Apparatus

An inkjet recording apparatus 1 is described as an example of an image forming apparatus according to an embodiment of the present disclosure.

FIG. 1 is a diagram illustrating a configuration of the inkjet recording apparatus 1 according to the present embodiment. The inkjet recording apparatus 1, which is a liquid discharging apparatus, is a serial-type inkjet recording apparatus. As illustrated in FIG. 1, the inkjet recording apparatus 1 includes an image forming device 2 that prints a given image, a drier 3, a roll medium holder 4, and a conveyance mechanism 5. The roll medium holder 4 stores a recording medium 40 as a recording medium, which is a roll medium to be printed. Note that the roll medium holder 4 can store recording media 40 having different sizes in the width direction. The recording medium 40 is a transparent non-permeable medium such as a polyethylene terephthalate (PET) film.

The conveyance mechanism 5 serves as a roll-to-roll type conveyance device. The conveyance mechanism 5 includes a nip roller pair 51, a driven roller pair 52, and a winding roller 53 on a conveyance path 54 on which the recording medium 40 is conveyed. The nip roller pair 51 is disposed upstream from the image forming device 2 in a medium conveyance direction A. The nip roller pair 51 rotates with driving of a motor M (refer to FIG. 2) to convey the recording medium 40 nipped by the nip roller pair 51 toward the image forming device 2. The winding roller 53 rotates with the driving of the motor M to wind the recording medium 40 on which an image has been printed. The driven roller pair 52 is driven to rotate with the conveyance of the recording medium 40.

The conveyance mechanism 5 includes a wheel encoder 55 (see FIG. 2) for detecting the conveyance speed of the conveyance mechanism 5. The motor M is controlled based on a target value and a speed detection value obtained by sampling detection pulses from the wheel encoder 55 to control the conveyance speed of the conveyance mechanism 5.

As described above, the recording medium 40 stored in the roll medium holder 4 is conveyed to the image forming device 2 by the rotation of the nip roller pair 51 via the driven roller pair 52. The image forming device 2 prints a desired image on the recording medium 40 that has reached the image forming device 2. The recording medium 40 on which the image has been printed is wound by rotation of the winding roller 53.

The image forming device 2 includes a carriage 21. The carriage 21 is slidably held by a guide rod 22 that serves as a guide rail. The carriage 21 moves on the guide rod 22, serving as a guide rail, in a direction orthogonal to the medium conveyance direction A of the recording medium 40, i.e., the main scanning direction, in accordance with driving of the motor M. More specifically, in a main scanning region that is a movable region of the carriage 21 in the main scanning direction, the carriage 21 reciprocates within a recording area in which the image forming device 2 can perform printing on the recording medium 40 conveyed by the conveyance mechanism 5.

The carriage 21 includes a recording head 20 in which multiple nozzle orifices as discharge ports for discharging liquid droplets are arranged. Note that the recording head 20 is unified with a tank from which ink is supplied to the recording head 20. However, the recording head 20 is not limited to such a configuration as described above in which the recording head 20 is unified with the tank, and the recording head 20 may be provided with a tank as a separate body from the recording head 20. The recording head 20 functions as a liquid discharge device, and discharges ink droplets of respective colors of black (K), yellow (Y), magenta (M), and cyan (C) that are recording liquids of process colors. Black (K) ink, yellow (Y) ink, magenta (M) ink, and cyan (C) ink are used for image formation. In addition, the recording head 20 discharges ink droplets of white (W) that is auxiliary ink used as ink for a background or a base. The recording head 20 further discharges ink of respective colors of orange (O) and green (G) that are recording liquids of special colors different in hue from the recording liquids of the above-described process colors, used for improving color reproducibility.

In the present embodiment, applying auxiliary ink to an area of the recording medium 40 overlapping with an area in which an image is to be formed is referred to as forming a base, such as when the auxiliary ink (for example, white ink) is applied to the entire surface of the recording medium 40 to be printed or when the auxiliary ink is applied only to an area in which an image is to be formed on the recording medium 40. In addition, a case in which the auxiliary ink is applied to an area of the recording medium 40 that does not overlap with an area in which an image is to be formed is referred to as forming a background. For this reason, forming a base or a background represents applying the auxiliary ink to the entire surface of the recording medium 40. In addition, forming a base or a background represents a state in which an area in which an image is to be formed on the recording medium 40 and an area to which the auxiliary ink is applied do not fully coincide with each other, such as a state in which an auxiliary ink layer is present in a part of an area overlapping the image and the auxiliary ink layer is present in a part of an area in which an image is not to be formed but not present on the entire surface of the recording medium 40.

The image forming device 2 includes a platen 23 that supports the recording medium 40 below the recording head 20 when printing is performed by the recording head 20.

Further, the image forming device 2 includes an encoder sheet for detecting a main scanning position of the carriage 21 in the main scanning direction of the carriage 21. The carriage 21 includes an encoder 26 (see FIG. 2). The image forming device 2 reads the encoder sheet with the encoder 26 of the carriage 21 to detect the main scanning position of the carriage 21.

The carriage 21 includes a sensor 24 that optically detects an end of the recording medium 40 in accordance with the movement of the carriage 21. A detection signal from the sensor 24 is used to calculate the position of the end of the recording medium 40 in the main scanning direction and the width of the recording medium 40.

The drier 3 includes a preheater 30, a platen heater 31, a drying heater 32, and a warm air fan 33. The preheater 30, the platen heater 31, and the drying heater 32 are electric heaters using, for example, ceramics or nichrome wires.

The preheater 30 is disposed upstream from the image forming device 2 in the medium conveyance direction A of the recording medium 40. The preheater 30 preliminarily heats the recording medium 40 conveyed by the conveyance mechanism 5.

The platen heater 31 is disposed on the platen 23. The platen heater 31 heats the recording medium 40 on which the ink droplets discharged from the nozzle orifices of the recording head 20 land.

The drying heater 32 is disposed downstream from the image forming device 2 in the medium conveyance direction A of the recording medium 40. The drying heater 32 subsequently heats the recording medium 40 on which printing has been performed by the image forming device 2 and accelerates drying of the landed ink droplets.

The warm air fan 33 is disposed downstream from the drying heater 32 of the image forming device 2 in the medium conveyance direction A of the recording medium 40. The warm air fan 33 blows warm air to a recording surface of the recording medium 40 on which the ink droplets have landed. The warm air fan 33 directly blows the warm air to the ink droplets landed on the recording surface of the recording medium 40. Thus, the humidity of the atmosphere around the recording surface of the recording medium 40 is reduced and the ink droplets are sufficiently dried.

The inkjet recording apparatus 1 is provided with the drier 3 as described above. By so doing, the inkjet recording apparatus 1 can employ, as the recording medium 40, a non-permeable medium into which ink does not permeate, such as vinyl chloride, PET, or acryl. When a non-permeable medium is employed for the inkjet recording apparatus 1, the inkjet recording apparatus 1 can use solvent-based ink or water-based resin ink having a large amount of a resin component, well fixed to the non-permeable medium, as the ink used in the image forming device 2.

Note that the inkjet recording apparatus 1 that discharges ink from the recording head 20 while the carriage 21 reciprocates in the width of the recording medium 40 to form an image, can perform unidirectional printing to form an image by discharging ink only when a carriage operation is performed in the forward path, and bidirectional printing to form an image by discharging ink when the carriage operation is performed in both the forward path and the backward path. In the inkjet recording apparatus 1, bidirectional printing which is advantageous in terms of printing speed is typically used. Note that in the present embodiment, an operation of discharging ink from the recording head 20 while the carriage 21 moves in the main scanning direction is counted as one scan.

Control Configuration of Inkjet Recording Apparatus

Figure 2:
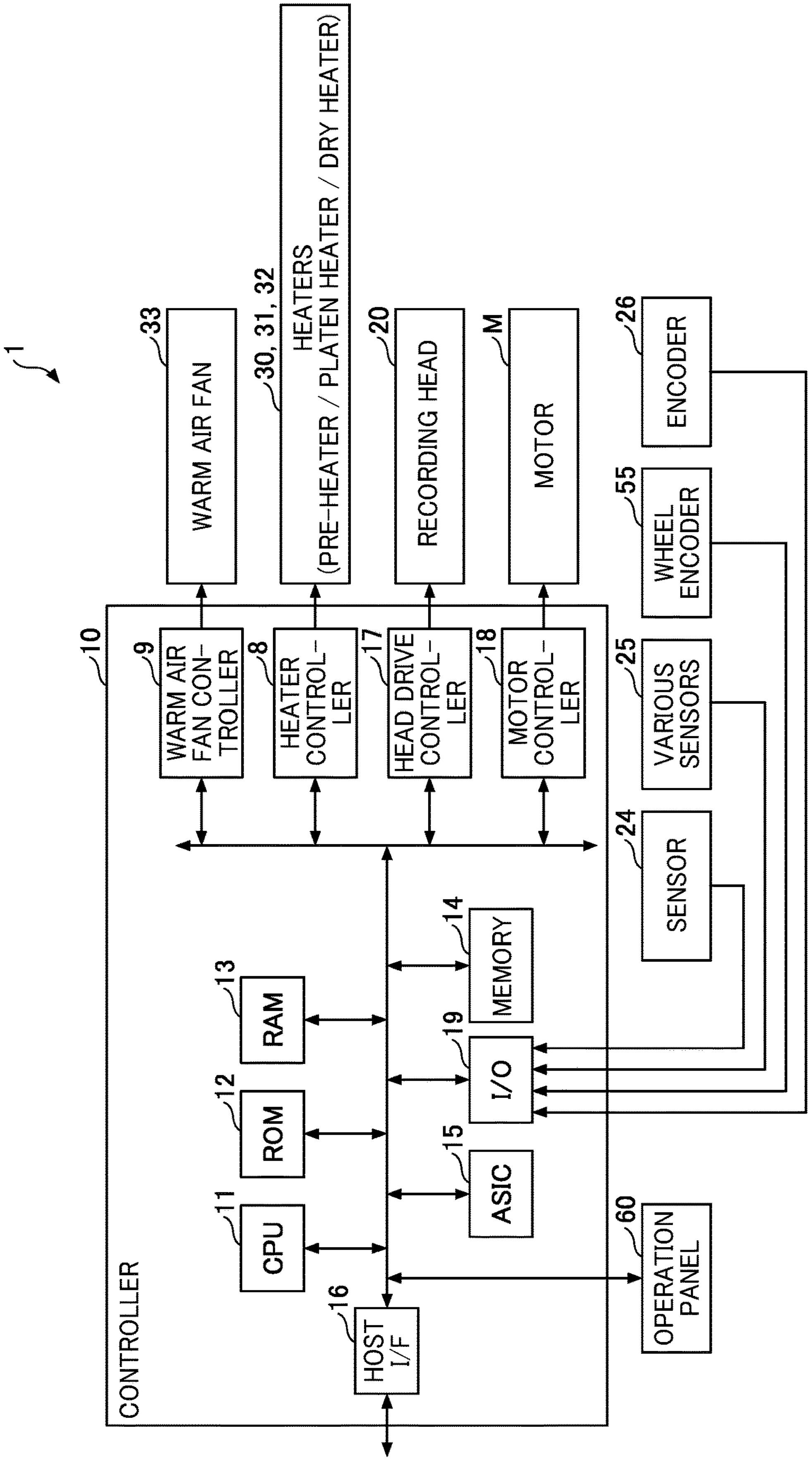
FIG. 2 is a block diagram illustrating a configuration of control blocks of the inkjet recording apparatus of FIG. 1.

Next, a control configuration of the inkjet recording apparatus 1 is described. FIG. 2 is a block diagram illustrating a configuration of control blocks of the inkjet recording apparatus 1.

As illustrated in FIG. 2, the inkjet recording apparatus 1 includes a controller 10 that controls the entire inkjet recording apparatus 1. The controller 10 includes a central processing unit (CPU) 11 that serves as a main controller, a read only memory (ROM) 12, a random access memory (RAM) 13, a memory 14, and an application specific integrated circuit (ASIC) 15. The ROM 12 stores computer programs executed by the CPU 11 and other fixed data. The RAM 13 temporarily stores, for example, image data. The memory 14 is a rewritable nonvolatile memory for holding data even while the power supply of the inkjet recording apparatus 1 is shut off. The ASIC 15 executes image processing such as various kinds of signal processing and rearrangement directed to image data, and other input and output signal processing for controlling the entire inkjet recording apparatus 1.

Further, as illustrated in FIG. 2, the controller 10 includes a host interface (I/F) 16, a head drive controller 17, a motor controller 18, and an input and output (I/O) 19.

The host I/F 16 transmits and receives image data as print data and control signals to and from a host device via a cable or a network. Examples of the host device connected to the inkjet recording apparatus 1 include an information processing apparatus such as a personal computer, an image reading apparatus such as an image scanner, and an imaging apparatus such as a digital camera.

The I/O 19 receives detection pulses as inputs from the encoder 26 and the wheel encoder 55. In addition, the I/O 19 connects various sensors 25 that include such as a moisture sensor, a temperature sensor, and other sensors other than the sensor 24. The I/O 19 receives detection signals as inputs from the sensor 24 and the various sensors 25.

The head drive controller 17 drives and controls the recording head 20 and includes a data transfer unit. More specifically, the head drive controller 17 transfers image data as serial data. In addition, the head drive controller 17 generates transfer clock signals and latch signals necessary for, for example, transferring of image data and determination of transfer, and a drive waveform used when liquid droplets are discharged from the recording head 20. Then, the head drive controller 17 inputs, for example, the generated drive waveform to a drive circuit inside the recording head 20.

The motor controller 18 drives the motor M. More specifically, the motor controller 18 calculates a control value based on a target value given from the CPU 11 and a speed detection value obtained by sampling detection pulses from the wheel encoder 55. Then, the motor controller 18 drives the motor M based on the calculated control value via an internal motor drive circuit.

Further, the controller 10 includes a heater controller 8 and a warm air fan controller 9.

The heater controller 8 controls outputs of a preheater 30, a platen heater 31, and a drying heater 32 so that temperatures output from the preheater 30, the platen heater 31, and the drying heater 32 approach set temperatures. More specifically, when the heater controller 8 controls each of the preheater 30, the platen heater 31, and the drying heater 32, the heater controller 8 acquires temperature data from a temperature sensor disposed at each of the preheater 30, the platen heater 31, and the drying heater 32. While the heater controller 8 monitors the temperature of each of the preheater 30, the platen heater 31, and the drying heater 32, the heater controller 8 performs control so that the temperature of each of the preheater 30, the platen heater 31, and the drying heater 32 approaches the set temperature. When a heater is disposed in the tank of the recording head 20 or on an ink path, the heater controller 8 controls the heater in a similar manner as described above.

The warm air fan controller 9 controls the output of the warm air fan 33 so that air is blown at a predetermined temperature and at a predetermined air volume.

The controller 10 is connected to an operation panel 60 for inputting and displaying information necessary for the inkjet recording apparatus 1.

The CPU 11 develops and executes, in the RAM 13, a computer program read from the ROM 12 or the memory 14. By so doing, the controller 10 collectively controls each of the above-described functional units. More specifically, the CPU 11 reads control contents set for each print mode from the ROM 12 or the memory 14 based on a print mode set through the operation panel 60. The CPU 11 controls each of the functional units based on the control content read from the ROM 12 or the memory 14 to execute control related to image formation.

Note that the computer program to be executed on the inkjet recording apparatus 1 according to the present embodiment is recorded and provided in a computer-readable recording medium, such as a compact disc-read only memory (CD-ROM), a flexible disk (FD), a compact disc-recordable (CD-R), or a digital versatile disk (DVD), in a file in installable or executable format.

The computer program executed by the inkjet recording apparatus 1 according to the present embodiment may be stored in a computer connected to a network such as the Internet and provided by being downloaded via the network. The computer program executed by the inkjet recording apparatus 1 according to the present embodiment may be provided or distributed via a network such as the Internet.

The computer program executed by the inkjet recording apparatus 1 according to the present embodiment may be provided by being incorporated, for example, in a ROM in advance.

Next, image data transfer printing processing executed by the controller 10 of the inkjet recording apparatus 1 is briefly described. The CPU 11 of the controller 10 reads and analyzes image data, i.e., print data, in a reception buffer included in the host I/F 16, and performs, for example, image processing and rearrangement processing in the ASIC 15. Next, the CPU 11 of the controller 10 transfers the image data, i.e., the print data, processed in the ASIC 15, from the head drive controller 17 to the recording head 20.

In particular, in the present embodiment, coalescence prevention control for adjusting the amount of ink discharged from the recording head 20 is performed to prevent ink droplets discharged onto the recording medium 40 from being coalesced in image processing of the ASIC 15. Details of the coalescence prevention control are described later with reference to FIGS. 5, 6, 7, 8, 9, 10, 11, 12A, 12B, 12C, 12D, 12E, 12F, 12G, 13, and 14A, 14B, and 14C.

Note that generation of dot pattern data for image output may be performed by, for example, storing font data in the ROM 12, or by expanding image data into bitmap data by a printer driver on a host device and transferring the bitmap data to the inkjet recording apparatus 1.

Configuration of Recording Head

Figure 3:
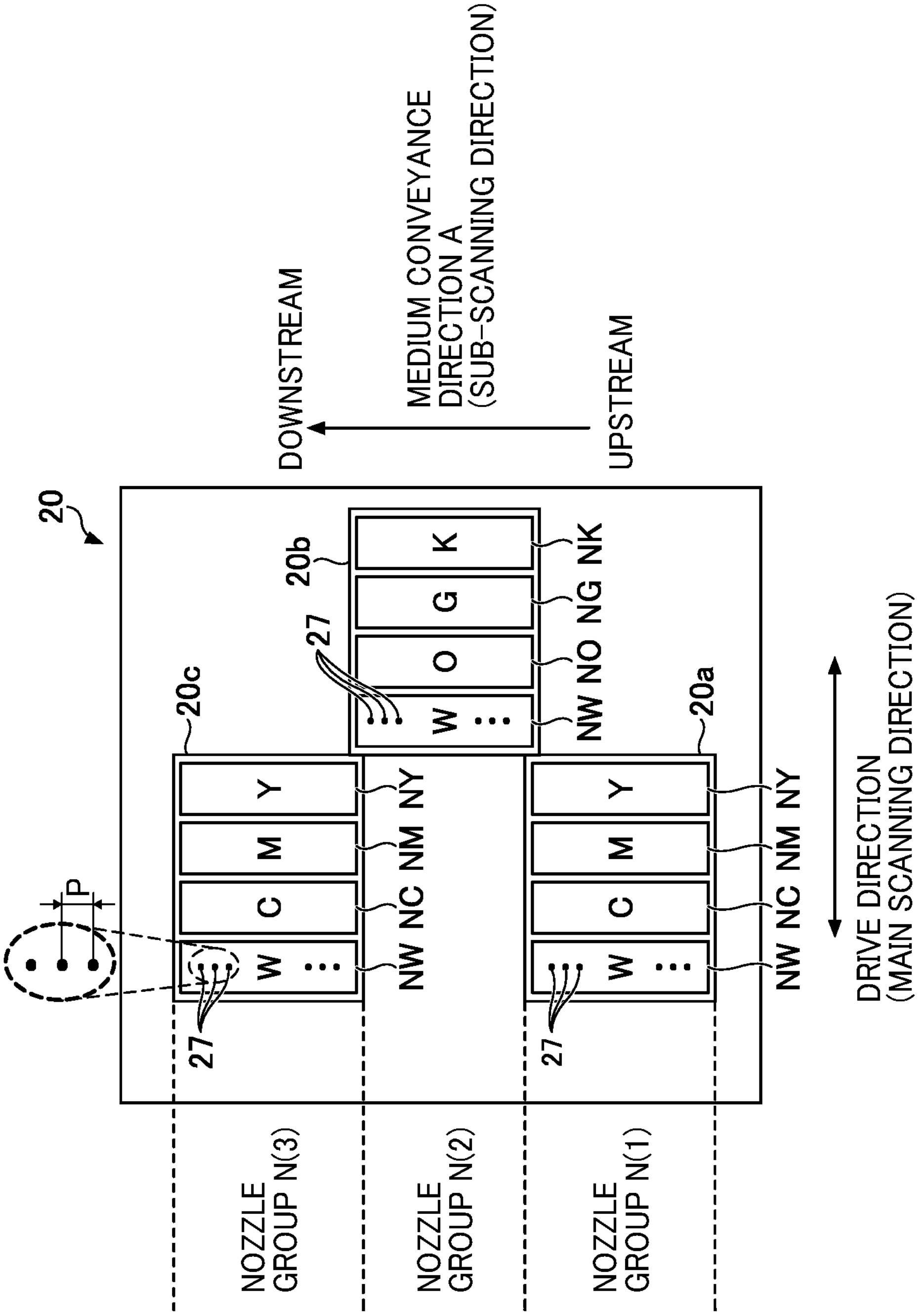
FIG. 3 is a plan view of a surface of a recording head provided for the inkjet recording apparatus of FIG. 1, on which nozzle groups are arranged as a configuration example, according to an embodiment of the present disclosure.

FIG. 3 is a plan view of a surface of a recording head 20 on which nozzle groups are arranged, according to an embodiment of the present disclosure.

As illustrated in FIG. 3, the recording head 20 includes a first nozzle group 20*a*, a second nozzle group 20*b*, and a third nozzle group 20*c*.

As illustrated in FIG. 3, the first nozzle group 20*a*, the second nozzle group 20*b*, and the third nozzle group 20*c* are arranged alternately in two rows in the main scanning direction and in a staggered manner in the sub-scanning direction. In other words, the first nozzle group 20*a*, the second nozzle group 20*b*, and the third nozzle group 20*c* are arranged in the order of the third nozzle group 20*c*, the second nozzle group 20*b*, and the first nozzle group 20*a* such that nozzle rows of the first nozzle group 20*a*, the second nozzle group 20*b*, and the third nozzle group 20*c* do not overlap from each other from downstream toward upstream in the medium conveyance direction A of the recording medium 40. Further, as illustrated in FIG. 3, the second nozzle group 20*b* is disposed at a position shifted from the first nozzle group 20*a* and the third nozzle group 20*c* in the main scanning direction.

Each of the first nozzle group 20*a* and the third nozzle group 20*c* includes one nozzle row that discharges ink droplets of auxiliary ink as background ink and base ink and three nozzle rows that discharge ink droplets of cyan, magenta, and yellow (CMY) colors as process colors for image formation. Each of the nozzle rows includes, for example, one hundred ninety-two nozzle orifices 27. In an example illustrated in FIG. 3, the nozzle orifices 27 are arranged in the medium conveyance direction A. Note that the pitch P between the nozzle orifices 27 is, for example, 150 dots per inch (dpi).

As illustrated in FIG. 3, each of the first nozzle group 20*a* and the third nozzle group 20*c* includes a white ink nozzle row NW that discharges white (W) ink droplets as an example of auxiliary ink as background ink and base ink, a cyan ink nozzle row NC that discharges cyan (C) ink droplets, a magenta ink nozzle row NM that discharges magenta (M) ink droplets, and a yellow ink nozzle row NY that discharges yellow (Y) ink droplets.

Similar to the first nozzle group 20*a*, the second nozzle group 20*b* also includes four nozzle rows each having one hundred ninety-two nozzle orifices 27. In the second nozzle group 20*b*, as in the first nozzle group 20*a*, the pitch P between the nozzle orifices 27 is 150 dpi.

The second nozzle group 20*b* includes nozzle rows for auxiliary recording. To be more specific, the second nozzle group 20*b* includes one nozzle row that discharges ink droplets of auxiliary ink as background ink and base ink, two nozzle rows that discharge ink droplets of special color for image formation, and one nozzle row that discharges ink droplets of black (K) as process color for image formation.

As illustrated in FIG. 3, the second nozzle group 20*b* includes a nozzle row NW that discharges white (W) ink droplets as an example of auxiliary ink as background ink and base ink. In addition, the second nozzle group 20*b* includes a nozzle row NO that discharges orange (O) ink droplets and a nozzle row NG that discharges green (G) ink droplets as examples of special color ink for image formation. Further, the second nozzle group 20*b* includes a nozzle row NK that discharges black (K) ink droplets.

As described above, each of the first nozzle group 20*a*, the second nozzle group 20*b*, and the third nozzle group 20*c* includes the same number of nozzle rows and the same number of nozzles. Accordingly, the first nozzle group 20*a*, the second nozzle group 20*b*, and the third nozzle group 20*c* can include the same components as each other. Thus, the number of types of components can be reduced, and the cost of the inkjet recording apparatus can be reduced.

In the present embodiment, a description is given of an example of an image forming operation using the recording head 20 that includes the three nozzle groups, the first nozzle group 20*a*, the second nozzle group 20*b*, and the third nozzle group 20*c* illustrated in FIG. 3. In this case, an image is formed by performing a scan operation in which ink droplets are discharged from each of the first nozzle group 20*a*, the second nozzle group 20*b*, and the third nozzle group 20*c* in image areas, such as image area a and image area b illustrated in FIG. 8, each having a predetermined width, arranged in the medium conveyance direction A of the recording medium 40. In other words, the same number of times of scan operations as the number of nozzle groups included in the recording head 20 (three times in this example) is performed on each of the image areas.

In the present embodiment, an operational mode is described in which a white ink layer is formed as a base and a background, and then a colored layer that is a color image in six colors is formed.

The controller 10 of the inkjet recording apparatus 1 conveys the recording medium 40 by the width of each of the nozzle rows of the first nozzle group 20*a*, the second nozzle group 20*b*, and the third nozzle group 20*c* in the medium conveyance direction A, in each of the scan operations. Accordingly, a first scan, a second scan, and a third scan described below can be sequentially performed in predetermined image areas.

At the time of the first scan, the controller 10 of the inkjet recording apparatus 1 uses the nozzle row NW of the first nozzle group 20*a* to start forming white solid as a base and a background.

At the time of the second scan, the controller 10 of the inkjet recording apparatus 1 uses the nozzle rows NO, NG, and NK of the second nozzle group 20*b* to form an image on the white solid.

At the time of the third scan, the controller 10 of the inkjet recording apparatus 1 uses the nozzle rows NC, NM, and NY of the third nozzle group 20*c* to form an image.

According to such an operational mode described above, ink droplets land in the order of white (W) that forms a base, black (K), green (G), orange (O), yellow (Y), magenta (M), and cyan (C). As drying of the white (W) ink progresses, coloring agents (C, M, Y, O, G, and K colors) remain on the surface of the recording medium 40, and the C, M, Y, O, G, and K colors develop sufficiently. In other words, in this case, the colors are more easily developed in the order of C, M, Y, O, G, and K color.

Figure 4:
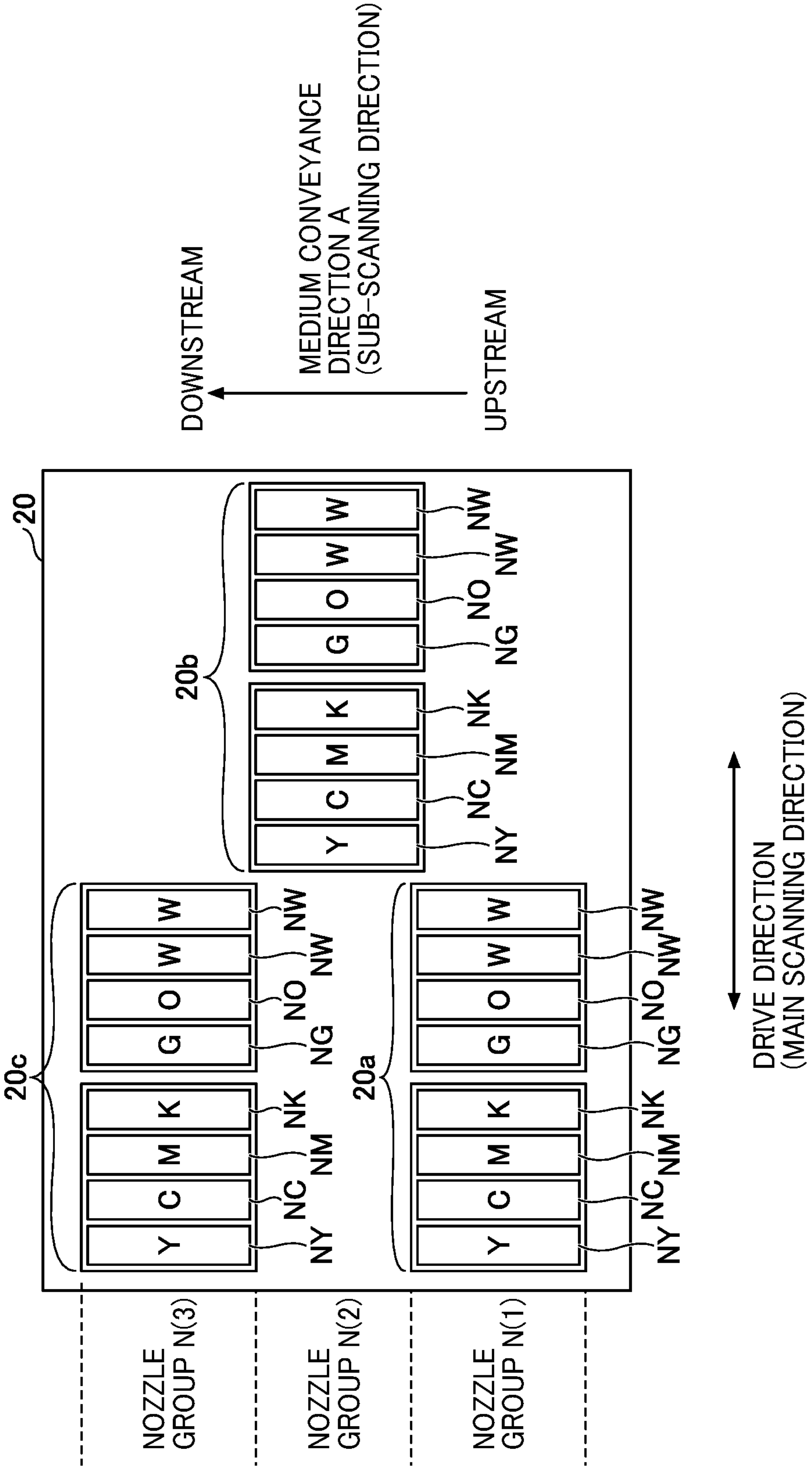
FIG. 4 is a plan view of a surface of a recording head in another configuration in which nozzle groups are arranged as another configuration example, according to another embodiment of the present disclosure.

FIG. 4 is a plan view of a surface of a recording head 20 on which nozzle groups are arranged, according to another embodiment of the present disclosure. In an example illustrated in FIG. 4, the recording head 20 includes the first nozzle group 20*a*, the second nozzle group 20*b*, and the third nozzle group 20*c* that are arranged in two rows in the main scanning direction and alternately in the sub-scanning direction in a staggered manner. Each of the first nozzle group 20*a*, the second nozzle group 20*b*, and the third nozzle group 20*c* has the same configuration in which eight nozzle rows of yellow (Y), cyan (C), magenta (M), black (K), green (G), orange (O), white (W), and white (W) are arranged.

Also, as described in the example of FIG. 4, the nozzle rows NW that discharge ink droplets of the auxiliary ink of white color (W) are arranged in all of the first nozzle group 20*a*, the second nozzle group 20*b*, and the third nozzle group 20*c* from upstream toward downstream in the medium conveyance direction A of the recording medium 40. Such a configuration as described above allows the inkjet recording apparatus 1 to increase image forming speed when only the auxiliary ink is used. Also, an auxiliary layer formed using the auxiliary ink of white color (W) can be placed as a pre-printing layer, a post-printing layer, and an inter-printing layer with respect to an image layer, which is a layer of an image formed using the ink for image formation.

Note that the ink used in the inkjet recording apparatus 1 according to the present embodiment is not particularly limited. In particular, in the inkjet recording apparatus 1, using ink containing water, an organic solvent, a coloring material, resin particles, and a siloxane compound can enhance drying properties of the ink. Thus, bleeding can be suitably prevented.

In the following description, the first nozzle group 20*a* disposed at a most upstream position in the medium conveyance direction A is also referred to as a nozzle group N(1) or a first nozzle group, the second nozzle group 20*b* disposed downstream from the second nozzle group 20*a* in the medium conveyance direction A is referred to as a nozzle group N(2) or a second nozzle group, and a third nozzle group 20*c* disposed downstream from the second nozzle group 20*b* and disposed at a most downstream position in the medium conveyance direction A is referred to as a nozzle group N(3) or a third nozzle group. The nozzle groups N(1), N(2), and N(3) are arranged in order in the medium conveyance direction A, i.e., the sub-scanning direction so as not to overlap with each other when viewed from the main scanning direction.

Note that in the present embodiment, the nozzle groups N(1), N(2), and N(3) are "arranged in order so as not to overlap with each other" in the sub scanning direction means that the nozzles of the nozzle groups N(1), N(2), and N(3) that perform image formation, in other words, the nozzles that actually discharge ink are arranged so as not to overlap with each other. For example, a nozzle may be disposed at an end of the first nozzle group 20*a* and a nozzle may be disposed at an end of the second nozzle group 20*b* at a same position in the sub-scanning direction and ink is discharged from one of the nozzles. In such a configuration, when a discharge failure occurs to one of the nozzles due to, for example, nozzle clogging, the other one of the nozzles may be used as a spare nozzle. Such a configuration as described above is also included in the definition of "arranged in order so as not to overlap with each other".

Note that in the present embodiment, the recording head 20 is exemplified so far to have a configuration to discharge ink droplets of black (K), yellow (Y), magenta (M), cyan (C), orange (O), and green (G) as ink for image formation, and discharges ink droplets of white (W) as auxiliary ink. However, the types of colors of ink droplets discharged by the recording head 20 are not limited to these colors. For example, a configuration in which only four colors of black (K), yellow (Y), magenta (M), and cyan (C) are discharged may be employed.

In addition, in the present embodiment, a configuration in which the recording head 20 includes the three nozzle groups, namely, the first nozzle group 20*a*, the second nozzle group 20*b*, and the third nozzle group 20*c*, is described as an example. However, the number of nozzle groups included in the recording head 20 may be other than three. In other words, any configuration may be employed as long as multiple nozzles that are disposed in the recording head 20 and arranged in the sub-scanning direction can be divided into three nozzle groups N(1), N(2), and N(3). For example, only one nozzle group of the three nozzle groups illustrated in FIGS. 3 and 4 may be included in the recording head 20, and the only one nozzle group may be divided into the three nozzle groups N(1), N(2), and N(3) in the sub-scanning direction.

Further, the number of nozzle groups divided in the sub-scanning direction is not limited to three and may be equal to or greater than four. In other words, the multiple nozzle groups of the recording head 20 can be referred to as the nozzle group N(1), the nozzle group N(2), . . . a nozzle group N(n) or an N-th nozzle group (n is an integer).

In addition, in the recording head 20 illustrated in FIG. 3, three sub-heads physically separated from each other correspond to the first nozzle group 20*a*, the second nozzle group 20*b*, and the third nozzle group 20*c*, respectively. However, the method of dividing the nozzle groups is not limited to such a configuration. For example, all the nozzles included in the three sub-heads may be divided into four nozzle groups to serve as first, second, third, and fourth nozzle groups. Alternatively, instead of a recording head divided into three sub-heads, a recording head as a single long head may be used, and nozzles included in the single long head may be divided into multiple nozzle groups in the sub-scanning direction.

Principle of Occurrence of Coalescence of Dots

The principle of occurrence of the coalescence of dots is described with reference to FIGS. 5 and 6.

The coalescence of dots may occur depending on how landed ink droplets are wet and spread on the recording medium 40. The coalescence of dots refers to a phenomenon in which ink dots are merged and unified with each other due to surface tension, which is unique to an inkjet method.

When the coalescence of dots occurs, a dot that has landed earlier draws in ink of a dot that lands later. Accordingly, a portion of the surface of the recording medium 40 to be filled with ink is not sufficiently filled with ink even if the adhesion amount of ink is increased, or a boundary region between colors may be blurred.

The coalescence of dots has the following characteristics such as, (i) an ink dot landed later is drawn into an ink dot landed earlier, and (ii) ink dots landed at the same time attract each other.

Figure 5:
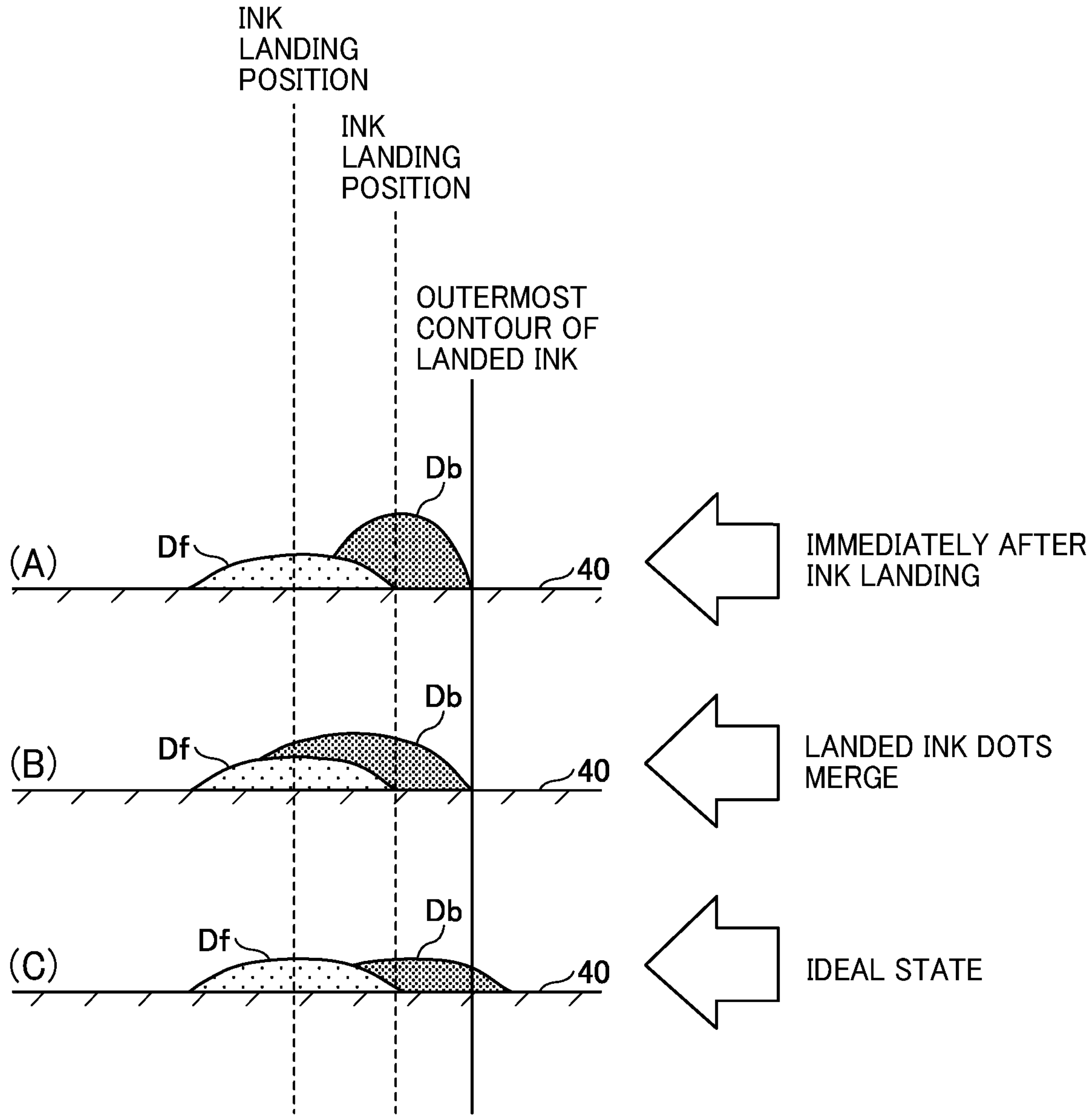
FIG. 5 is a schematic diagram illustrating coalescence of dots in which an ink droplet landed earlier draws in an ink droplet landed later.

FIG. 5 is a schematic diagram illustrating coalescence of dots in which an ink dot Df landed earlier draws in an ink dot Db landed later. The coalescence of dots illustrated in FIG. 5 corresponds to the above-described characteristics (i) and FIG. 5 illustrates a case in which the ink dot Df lands earlier on the recording medium 40, and then the ink dot Db lands later on the recording medium 40.

Part (A) of FIG. 5 illustrates a state immediately after the ink dot Db lands on the recording medium 40. The earlier-landing ink dot Df has spread from the position in which the ink dot Df has landed on the recording medium 40. On the other hand, the later-landing ink dot Db has just landed. Accordingly, the distance from the center of the landing position to the outermost contour of the ink dot Db is shorter than the distance from the center of the landing position to the outermost contour of the earlier-landing ink dot Df.

Part (C) of FIG. 5 illustrates a state in which the later-landing ink dot Db behaves in an ideal manner. Ideally, ink of the later-landing ink dot Db also uniformly spreads on the recording medium 40 in a similar manner to the earlier-landing ink dot Df and spreads from the outermost contour of the ink dot Db immediately after the ink dot Db lands toward outside.

Part (B) of FIG. 5 illustrates an example of the coalescence of dots. In this example, the later-landing ink dot Db spreads on the ink of the earlier-landing ink dot Df. For this reason, as compared with the ideal behavior of the ink dot Db illustrated in Part (C) of FIG. 5, the later-landing ink dot Db does not spread outside of the outermost contour of the ink dot Db immediately after the ink dot Db lands.

Figure 6:
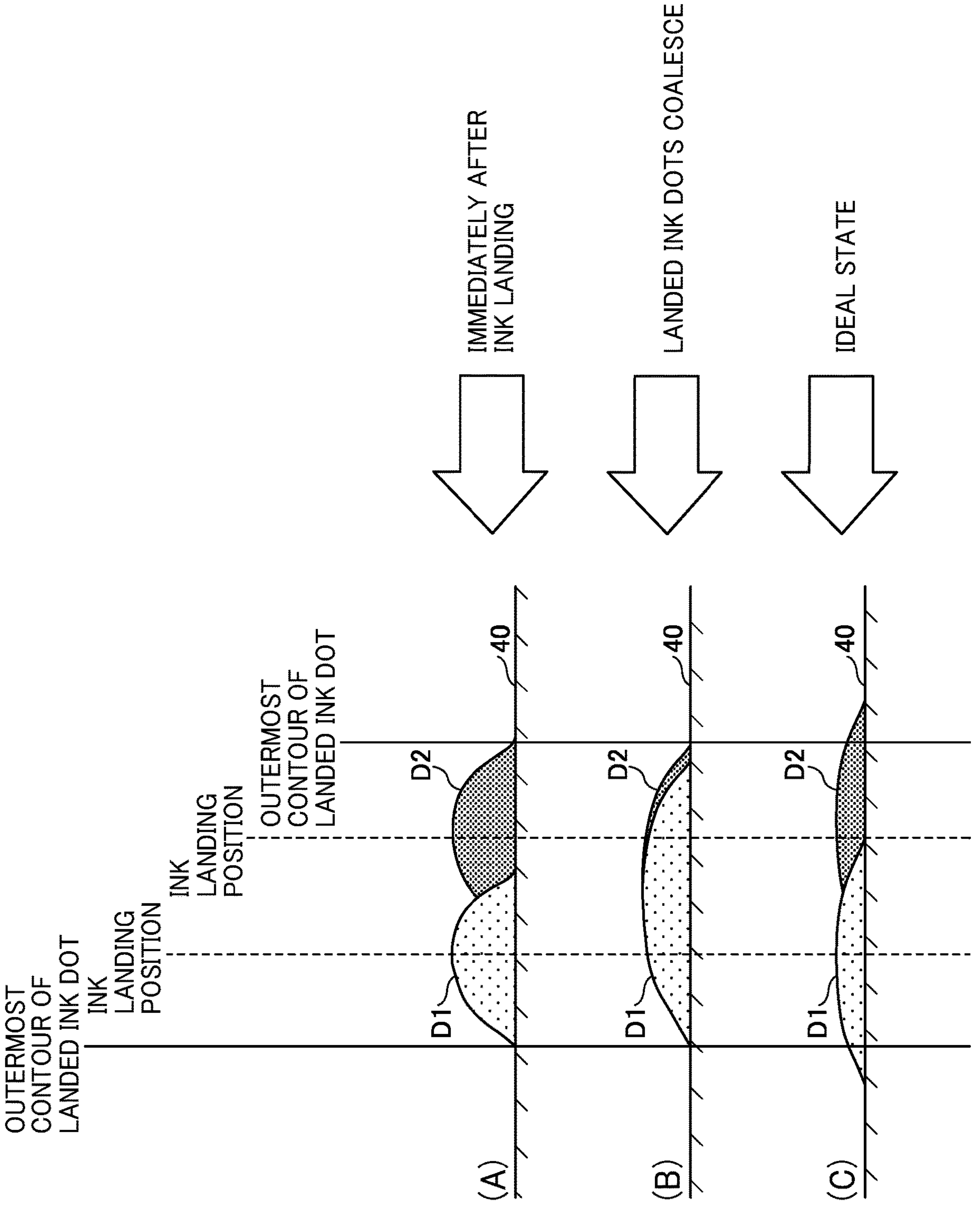
FIG. 6 is a schematic diagram illustrating how coalescence of dots occurs when two ink droplets discharged at the same time are attracted to each other.

FIG. 6 is a schematic diagram illustrating how coalescence of dots occurs when two landed ink dots D1 and D2 discharged at the same time are attracted to each other. The coalescence of dots illustrated in FIG. 6 corresponds to the above-described characteristics (ii) and illustrates a case in which the two landed ink dots D1 and D2 landed at the same time at positions adjacent to each other on the recording medium 40.

Part (A) of FIG. 6 illustrates the two landed dots D1 and D2 immediately after landing. Both of the landed dots D1 and D2 have just landed. Accordingly, the ink dots D1 and D2 are in a similar state to that of the ink dot Db that lands after the ink dot Df illustrated in part (A) of FIG. 5.

Part (C) of FIG. 6 illustrates how the landed ink dots D1 and D2 behaves ideally. Ideally, each of the landed ink dots D1 and D2 uniformly spreads on the recording medium 40 and spreads from the landing position outward beyond the outermost contour immediately after the ink dots D1 and D2 land.

Part (B) of FIG. 6 illustrates an example of the coalescence of dots. In this example, ink of the landed ink dots D1 and D2 spreads over each other. Accordingly, the landed dots D1 and D2 do not spread outside the outermost contour of the landed dots D1 and D2, respectively, immediately after landing, as compared with the ideal behavior of the landed ink dots D1 and D2 illustrated in part (C) of FIG. 6.

Coalescence of Dots Prevention Control

In particular, in the present embodiment, the nozzle discharge amount is controlled to prevent the coalescence of dots from occurring, as coalescence prevention control. Such a control can be performed by, for example, the ASIC 15 of the controller 10. The coalescence prevention control is described in the following description.

As described above, the coalescence of dots has the following two characteristics. First, an ink dot that lands later is drawn into an ink dot that lands earlier. Second, two dots that land at the same time attract each other.

For example, the following methods may reduce influences from the above-described characteristics of the coalescence of dots.

(a), ink dots are caused to land apart from each other (e.g., ink dot density is lowered or ink dots are not discharged between scan operations).

(b), the state described in (a) is realized in an initial stage of image completion to reduce the influence of dots that have landed earlier.

Figure 7:
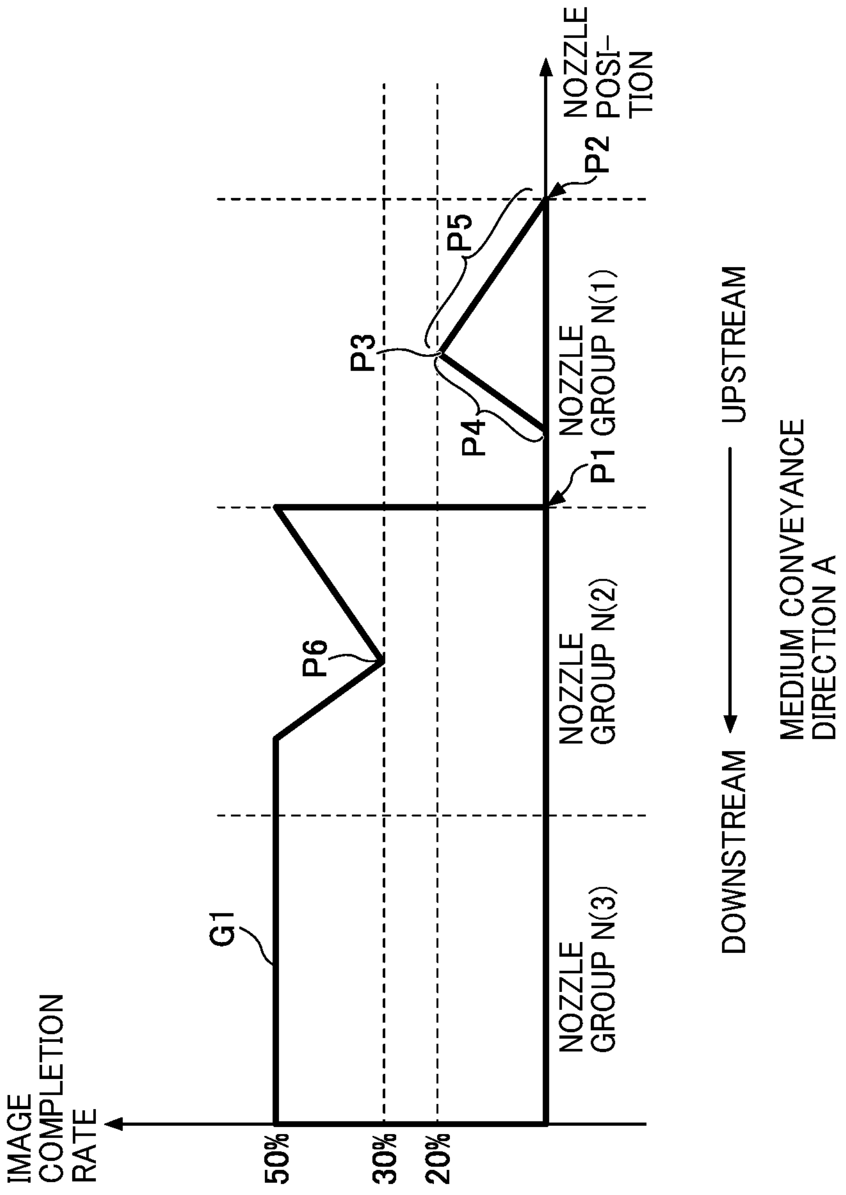
FIG. 7 is a diagram illustrating a distribution graph of image completion rates of the nozzle groups as a first example of the distribution graph in coalescence prevention control according to an embodiment of the present disclosure.

In the present embodiment, the distribution of the image completion rates of the multiple nozzle groups N(1), N(2), and N(3) of the recording head 20 is adjusted to achieve the above-described states (a) and (b). FIG. 7 is a diagram illustrating a first distribution graph G1 indicating the image completion rates of the nozzle groups N(1), N(2), and N(3) in the coalescence prevention control according to the present embodiment. In FIG. 7, the horizontal axis indicates nozzle positions, and the vertical axis indicates an image completion rate at each of the nozzle positions.

In the present embodiment, the image completion rate is a degree (or rate) of an image formed by each of the nozzle groups N(1), N(2), and N(3) when the amount of ink applied to the image finally formed by a predetermined number of scan operations of the recording head 20 is assumed to be 100% in each image area of the recording medium 40. Low image completion rate means that the dot density of the ink discharged onto the recording medium 40 is low, and high image completion rate means that the dot density of the ink discharged onto the recording medium 40 is high.

The horizontal axis in FIG. 7 corresponds to nozzle positions in the medium conveyance direction A illustrated in, for example, FIG. 3. The more rightward position on the horizontal axis corresponds to the more upstream position in the medium conveyance direction A, and the more leftward position on the horizontal axis corresponds to the more downstream position in the medium conveyance direction A.

In the present embodiment, the relation between the image completion rates and the allocation of the nozzle positions illustrated in FIG. 7, for example, is stored in advance as data in the ROM 12 illustrated in, for example, FIG. 2. Image data (print data) in the reception buffer included in the host I/F 16 is replaced with data on an image completion rate at each nozzle position during each scan in the image processing by the ASIC 15 and transferred from the head drive controller 17 to the recording head 20. The subject of the above-described data processing is the CPU 11. The image completion rate refers to a discharge ratio of ink. For example, in a case in which the image completion rate is desired to be 50%, the image completion rate of 50% can be achieved by performing control such that ink is discharged from every other nozzle among the nozzles arranged in one row.

Figure 8:
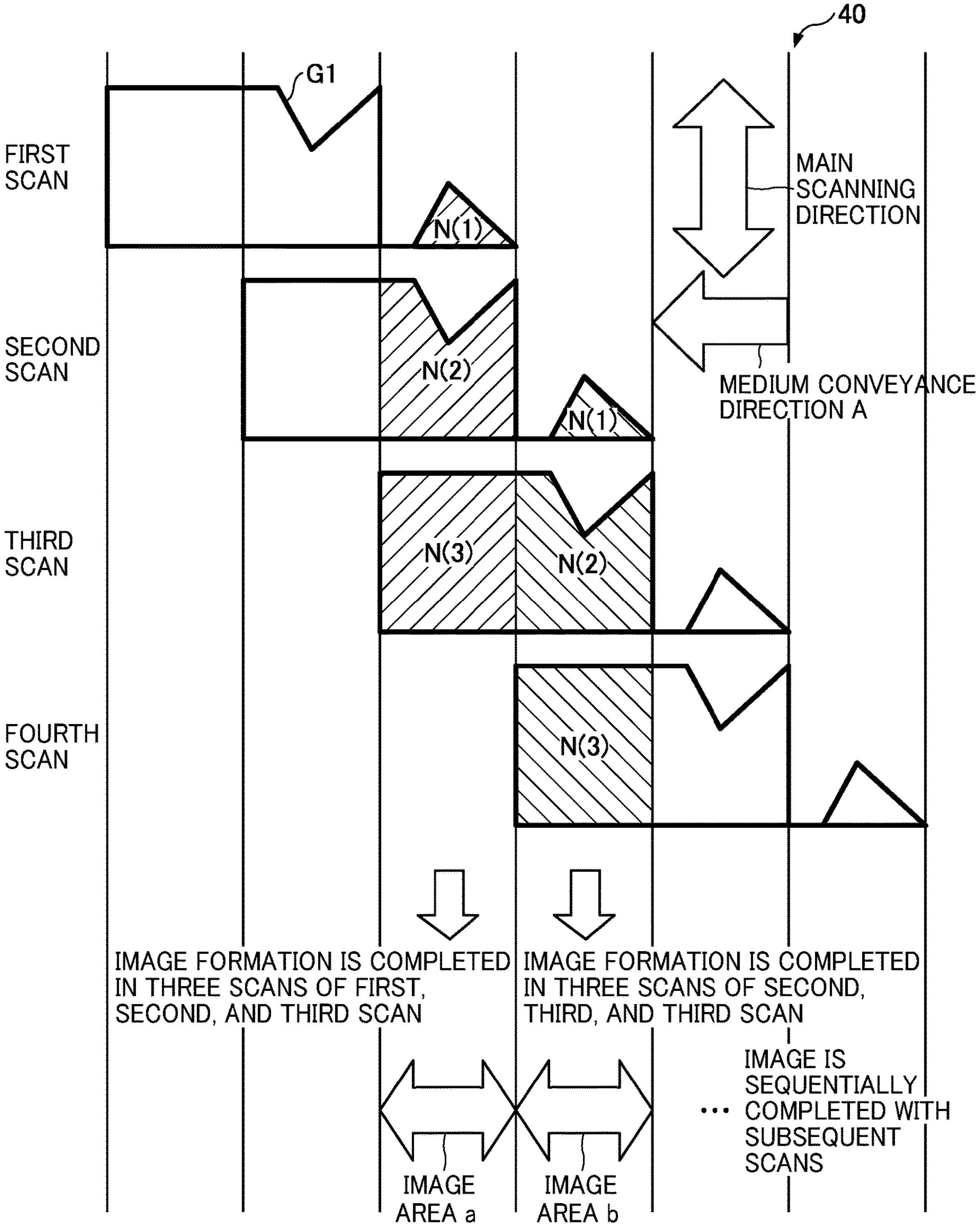
FIG. 8 is a diagram illustrating relations between the image completion rates and scan operations of the nozzle groups illustrated in FIG. 7, according to an embodiment of the present disclosure.

FIG. 8 is a diagram illustrating the relation between the image completion rates and the scan operations of the nozzle groups N(1), N(2), and N(3) illustrated in FIG. 7, according to the present embodiment. In FIG. 8, the medium conveyance direction A is illustrated as the left direction as indicated by an arrow. Relative positions of the nozzle groups N(1), N(2), and N(3) with respect to the recording medium 40 during a first, a second, a third, and a fourth scan are illustrated from an upper side to a lower side in FIG. 8. In FIG. 8, the distribution graph G1 that indicates the image completion rates in FIG. 7 is illustrated for each of the nozzle groups N(1), N(2), and N(3).

As described above, the relative positions of the nozzle groups N(1), N(2), and N(3) with respect to the recording medium 40 are moved in the medium conveyance direction A for each scan by the width of nozzle rows of corresponding one of the nozzle groups. As illustrated in the graph G1 in FIGS. 7 and 8 as an example, distributions of the image completion rates of the nozzle groups N(1), N(2), and N(3) are set by the ASIC 15 of the controller 10 so that the total sum of the image completion rates of the nozzle groups N(1), N(2), and N(3) allocated at each position in the medium conveyance direction A is 100%. The nozzle groups N(1), N(2), and N(3) of the recording head 20 perform image formation on the recording medium 40 based on the image data at each scan set by the ASIC 15.

Accordingly, for example, in an image area a having a predetermined width in the medium conveyance direction A on the recording medium 40 in FIG. 8, ink is discharged onto the recording medium 40 by the nozzle group N(1) based on an image completion rate allocated to the nozzle group N(1) in a first scan, ink is discharged onto the recording medium 40 by the nozzle group N(2) based on an image completion rate allocated to the nozzle group N(2) in a second scan, and ink is discharged onto the recording medium 40 by the nozzle group N(3) based on an image completion rate allocated to the nozzle group N(3) in a third scan. Accordingly, in the first, the second, and the third scans, the total sum of the image completion rates of the nozzle groups N(1), N(2), and N(3) is 100% in each position along the medium conveyance direction A in the image area a. Thus, the image is completed in the image area a.

Similarly, in an image area b adjacent to the image area a upstream from the image area a in the medium conveyance direction A, ink is discharged onto the recording medium 40 by the nozzle group N(1) based on an image completion rate allocated to the nozzle group N(1) in the second scan, ink is discharged onto the recording medium 40 by the nozzle group N(2) based on an image completion rate allocated to the nozzle group N(2) in the third scan, and ink is discharged onto the recording medium 40 by the nozzle group N(3) based on an image completion rate allocated to the nozzle group N(3) in the fourth scan. Accordingly, in the second, the third, and the fourth scans, the total sum of the image completion rates of the nozzle groups N(1), N(2), and N(3) is 100% in each position along the medium conveyance direction A in the image area b. Thus, the image is completed in the image area b.

Subsequently, by repeating the above-described scan operation, images are sequentially formed on the recording medium 40 in the medium conveyance direction A to complete the image.

In other words, in the image area a, the first scan operation corresponds to the first scan in which an image is formed by the nozzle group N(1), the second scan operation corresponds to the second scan in which an image is formed by the nozzle group N(2), and the third scan operation corresponds to the third scan in which an image is formed by the nozzle group N(3). In the image area b, the second scan operation corresponds to the first scan in which an image is formed by the nozzle group N(1), the third scan operation corresponds to the second scan in which an image is formed by the nozzle group N(2), and the fourth scan operation corresponds to the third scan in which an image is formed by the nozzle group N(3).

The number of scan operations in each of the image areas a and b may be changed to a number other than three in accordance with the number of nozzle groups included in the recording head 20. A configuration in which the recording head 20 includes N number of nozzle groups N(1) to N(n) is described below. In this case, the function of the controller 10 can be described as below. In other words, when the nozzle groups N(1) to N(n) are moved in the main scanning direction to form an image, the controller 10 causes the nozzle group N(1) to discharge liquid in the first scan, causes the nozzle group N(2) adjacent to the nozzle group N(1) to discharge liquid in the second scan after the first scan, causes the nozzle group N(n) adjacent to the nozzle group N(n−1) to discharge liquid in the N-th scan after the second scan, and forms a complete image in the predetermined image areas a and b of the recording medium 40 after the N-th scan is performed.

Multiple characteristics, i.e., first, second, third, fourth, and fifth characteristics of the distribution graph G1 indicating the image completion rates illustrated in FIG. 7 are individually described in the following description. As illustrated in FIG. 7, the image completion rate of the nozzle group N(1) that first discharges ink to each image area of the recording medium 40 has characteristics as described below.

First Characteristic

The image completion rate of the nozzle group N(1) is equal to or smaller than the image completion rate of another nozzle group N(2) or N(3).

In the example of FIG. 7, a maximum value P3 of the image completion rates of the nozzle group N(1) is 20%, a minimum value P6 of the image completion rates of the nozzle group N(2) is 30%, and the image completion rate of the nozzle group N(3) is evenly 50%, so as to satisfy the first characteristic. Such a first characteristic as described above can reduce the influence of the coalescence of dots in image areas onto which ink is discharged by the nozzle group N(1). In addition, lowering the density of dots discharged by the nozzle group N(1) can reduce the influence of coalescence of the dots with dots discharged in the next scan operation.

Second Characteristic

The image completion rate at a portion P1 adjacent to the nozzle group N(2) in the nozzle group N(1) is equal to or smaller than the image completion rate of another nozzle group N(2) or N(3).

The portion P1 of the nozzle group N(1) adjacent to the nozzle group N(2) is disposed at a position most downstream of the nozzle group N(1), which is the leftmost end of the nozzle group N(1) in FIG. 7, in the medium conveyance direction A and can also be referred to as a nozzle disposed at a position facing a nozzle at an upstream end of the nozzle group N(2), which is at the rightmost end of the nozzle group N(2) in FIG. 7. In the example of FIG. 7, the image completion rate at the portion P1 of the nozzle group N(1) that adjacent to the nozzle group N(2) is 0%, the image completion rate of the nozzle group N(2) is 30 to 50%, and the image completion rate of the nozzle group N(3) is evenly 50%, so as to satisfy the second characteristic. Such a second characteristic as described above can prevent dots formed by the nozzle group N(1) and the nozzle group N(2) from being attracted to each other and being coalesced with each other when the dots land at the same time on the recording medium 40. Thus, the dots discharged by the nozzle group N(1) can be prevented from moving from the target positions.

Third Characteristic

The image completion rate at a portion P2 of the nozzle group N(1) adjacent to an image area of the recording medium 40 is equal to or smaller than the image completion rate of another nozzle group N(2) or N(3).

The portion P2 of the nozzle group N(1) adjacent to the image area of the recording medium 40 is at a position most upstream of the nozzle group N(1) in the medium conveyance direction A, which is the rightmost end of the nozzle group N(1) in FIG. 7, and can also be referred to as a nozzle that directly discharges ink dots on a surface of the recording medium 40. In the example of FIG. 7, the image completion rate at the portion P2 of the nozzle group N(1) adjacent to the image area of the recording medium 40 is 0%, the image completion rate of the nozzle group N(2) is 30 to 50%, and the image completion rate of the nozzle group N(3) is evenly 50%, so as to satisfy the third characteristic. Such a third characteristic described above can prevent dots discharged by the nozzle group N(1) from being coalesced with each other, and can prevent dots discharged by the nozzle group N(1) and landed on the recording medium 40 at the same time from being attracted to each other. Thus, the dots discharged by the nozzle group N(1) can be kept at target positions.

Fourth Characteristic

The image completion rate of the nozzle group N(1) decreases from a portion P3 of the maximum value of the image completion rate of the nozzle group N(1) toward the portion P1 adjacent to the nozzle group N(2).

In the example of FIG. 7, a section P4 in which the image completion rate linearly decreases to 0% from the portion P3 at which the image completion rate of the nozzle group N(1) is the maximum value of 20% in a direction toward the portion P1 adjacent to the nozzle group N(2), in other words, in the left direction in FIG. 7, so as to satisfy the above-described fourth characteristic. Such a fourth characteristic described above can prevent the degree of density of dots in the nozzle group N(1) from being instantaneously changed and the degree of coalescence of dots from being instantaneously changed. Thus, the nozzles can be prevented from being clogged at a position at which the image completion rate is lowest, such as at the portion P1 adjacent to the nozzle group N(2).

Fifth Characteristic

The image completion rate decreases from the portion P3 of the maximum value of the image completion rate of the nozzle group N(1) toward the portion P2 adjacent to an image area of the recording medium 40.

In the example of FIG. 7, a section P5, from which the image completion rate linearly decreases from the portion P3 at which the image completion rate of the nozzle group N(1) is 20% as the maximum value to 0% in a direction toward the portion P2 adjacent to an image area of the recording medium 40, in other words, to the right in FIG. 7, so as to satisfy the fifth characteristic. Such a fifth characteristic described above can prevent the degree of density of dots in the nozzle group N(1) from being instantaneously changed and degree of coalescence of dots from instantaneously changed. Thus, nozzles can be prevented from being clogged at a position at which the image completion rate is lowest, such as at the portion P2 adjacent to an image area of the recording medium 40.

Note that all of the first, second, third, fourth, and fifth characteristics illustrated in FIG. 7 are not necessarily satisfied, and some of the first, the second, the third, the fourth, or the fifth characteristics may be satisfied. For example, such a configuration is adaptable, which satisfies: only the second characteristic; only the third characteristic; only the second and third characteristics; only the second and fourth characteristics; only the third and the fifth characteristics; or only the second, the third, the fourth, and the fifth characteristics.

Figure 9:
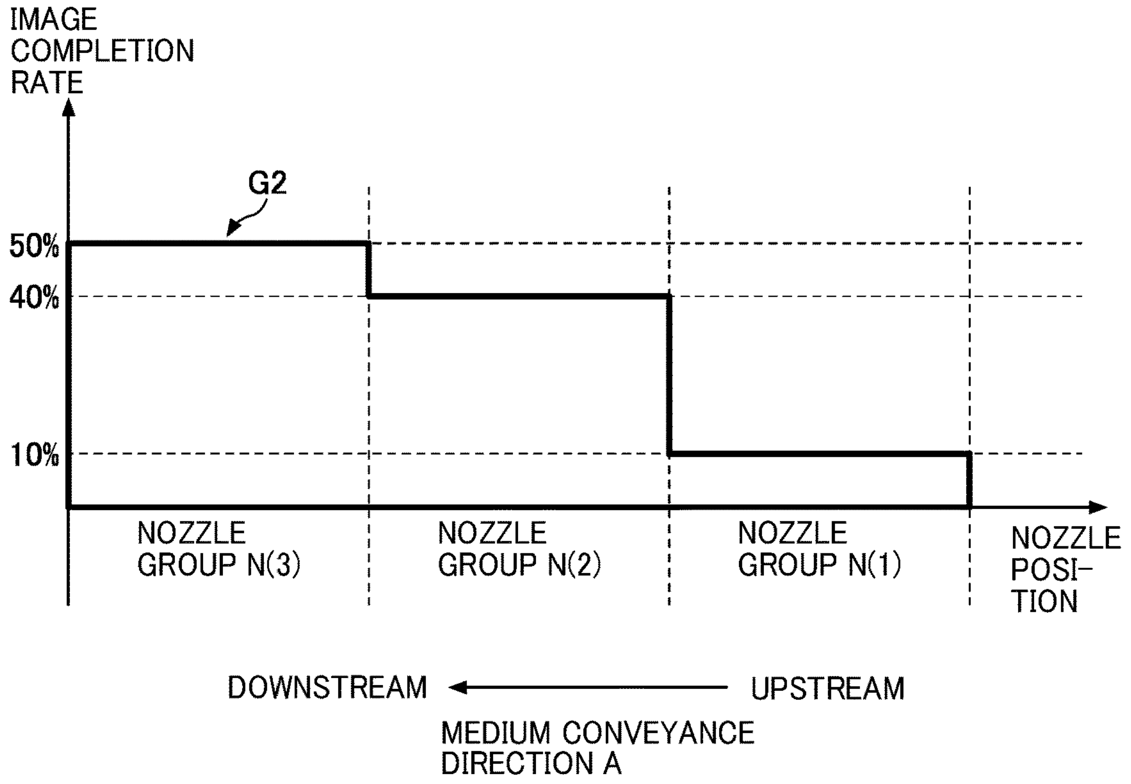
FIG. 9 is a diagram illustrating a distribution graph indicating image completion rates of the nozzle groups as a second example of the distribution graph, according to an embodiment of the present disclosure.

FIG. 9 is a diagram illustrating a second distribution graph G2 indicating image completion rates of the nozzle groups N(1), N(2), and N(3), according to the present embodiment. In the example of FIG. 9, the image completion rate of each nozzle groups N(1), N(2), and N(3) is set to a constant value. The image completion rate of the nozzle group N(1) is evenly 10%, the image completion rate of the nozzle group N(2) is evenly 40%, and the image completion rate of the nozzle group N(3) is evenly 50%, so as to satisfy the first characteristic.

Furthermore, the distribution graph G2 in FIG. 9 also satisfies the following sixth characteristic.

Sixth Characteristic

Minimum value of image completion rate of nozzle group N(p)≤minimum value of image completion rate of nozzle group N(p+1)

In the present embodiment, p is an integer equal to or greater than 1. In the example of FIG. 9, the minimum value 10% of the image completion rate of the nozzle group N(1) is smaller than the minimum value 40% of the image completion rate of the nozzle group N(2), and the minimum value 40% of the image completion rate of the nozzle group N(2) is smaller than the minimum value 50% of the image completion rate of the nozzle group N(3), so as to satisfy the above-described sixth characteristic. According to the sixth characteristic, as the scan number is smaller, in other words, the earlier a nozzle group scans a predetermined image area, the lower the image completion rate of the nozzle group and the lower the dot density. Accordingly, the influence of the coalescence of dots with dots discharged in a next scan can be reduced.

Note that in the distribution graph G1 illustrated in FIG. 7, the minimum image completion rate of the nozzle group N(1) is 0% at the portion P1 and the minimum image completion rate of the nozzle group N(2) is 30% at the portion P6. Accordingly, the minimum image completion rate of 0% of the nozzle group N(1) is smaller than the minimum image completion rate of 30% of the nozzle group N(2), and the minimum image completion rate of 30% of the nozzle group N(2) is smaller than the minimum image completion rate of 50% of the nozzle group N(3), so as to satisfy the above-described sixth characteristic.

Further, the distribution graph G2 illustrated in FIG. 9 also satisfies the second and the third characteristics described above.

Figure 10:
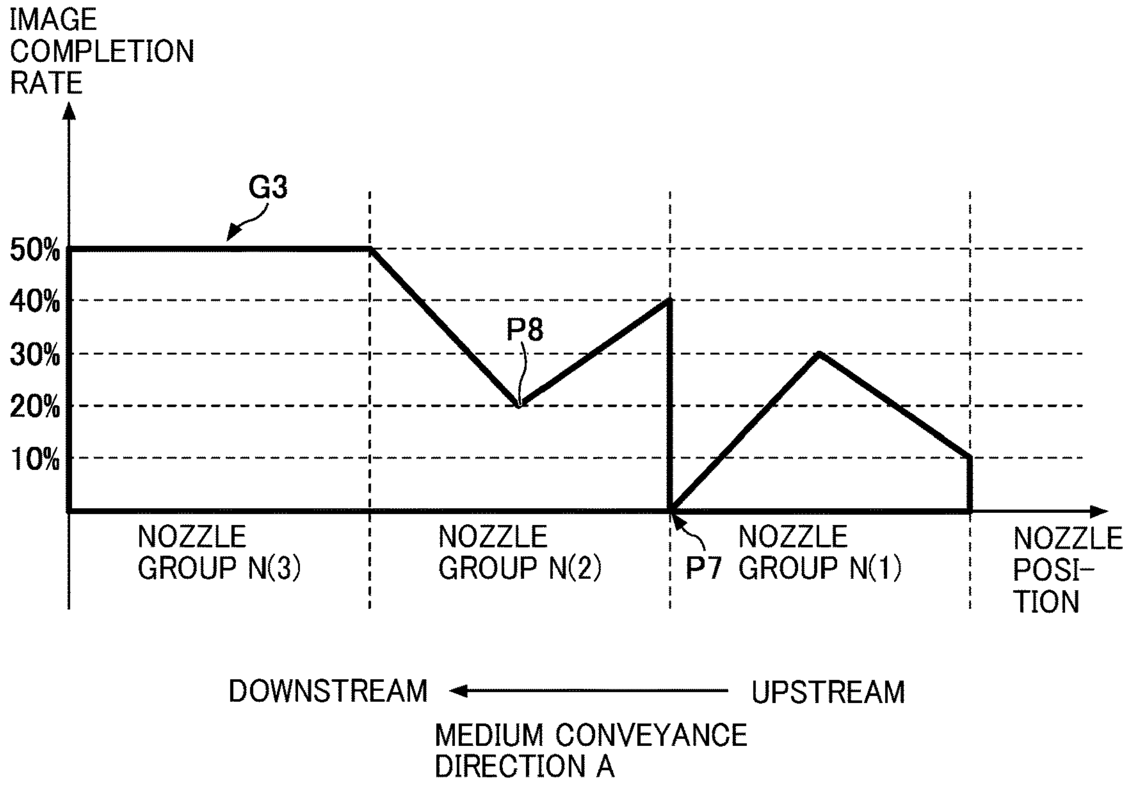
FIG. 10 is a diagram illustrating a distribution graph indicating image completion rates of the nozzle groups as a third example of the distribution graph, according to an embodiment of the present disclosure.

FIG. 10 is a diagram illustrating a distribution graph G3 indicating the image completion rates of the nozzle groups N(1), N(2), and N(3) as a third example of the distribution graph, according to the present embodiment. In the distribution graph G3 of FIG. 10, a minimum value of the image completion rate of the nozzle group N(1) is 0% at a portion P7 adjacent to the nozzle group N(2), in other words, at the leftmost portion P7 of the nozzle group N(1), a minimum value of the image completion rate of the nozzle group N(2) is 20% at a portion P8, and the image completion rate of the nozzle group N(3) is evenly 50%. Accordingly, the minimum value 0% of the image completion rate of the nozzle group N(1) is smaller than the minimum value 20% of the image completion rate of the nozzle group N(2), and the minimum value 20% of the image completion rate of the nozzle group N(2) is smaller than the minimum value 50% of the image completion rate of the nozzle group N(3), so as to satisfy the above-described sixth characteristic.

The distribution graph G3 in FIG. 10 also satisfies the above-described second, third, fourth and fifth characteristics.

The distribution graph G1 in FIG. 7, the distribution graph G2 in FIG. 9, and the distribution graph G3 in FIG. 10 also satisfy the following seventh characteristic.

Seventh Characteristic

Image completion rate of at least a part of nozzle group N(1)≤image completion rate of other nozzle groups N(2) and N(3)

Figure 11:
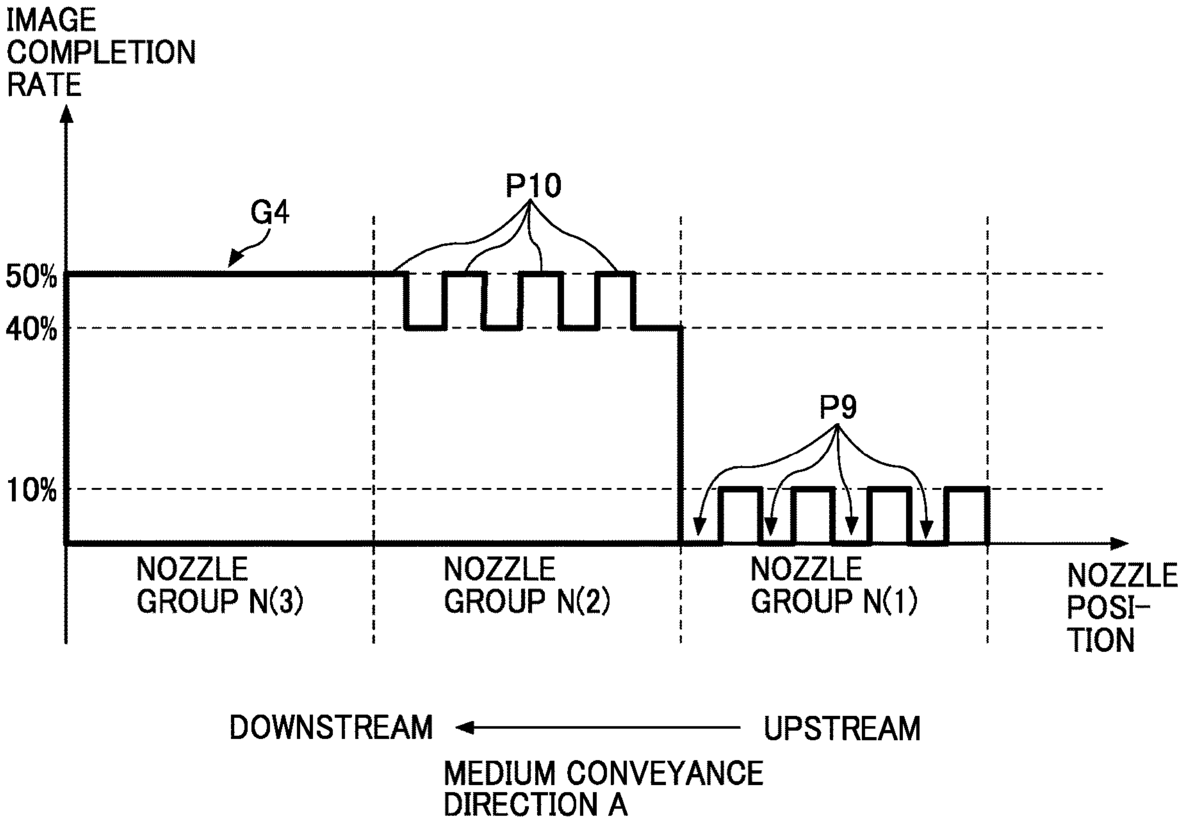
FIG. 11 is a diagram illustrating a distribution graph indicating image completion rates of the nozzle groups as a fourth example of the distribution graph, according to an embodiment of the present disclosure.

FIG. 11 is a diagram illustrating a fourth distribution graph G4 indicating the image completion rates of the nozzle groups N(1), N(2), and N(3), according to the present embodiment. In the distribution graph G4 of FIG. 11, four concave portions P9 are formed at a predetermined interval in the nozzle group N(1). The image completion rate is 0% at the concave portions P9 and 10% in the other portions of the nozzle group N(1). In the nozzle group N(2), convex portions P10 are formed at positions corresponding to the concave portions P9 of the nozzle group N(1). The image completion rate is 50% on the convex portions P10 and 40% in other portions of the nozzle group N(2). The image completion rate of the nozzle group N(3) is evenly 50%.

The distribution graph G4 in FIG. 11 satisfies the following eighth characteristic.

Eighth Characteristic

The image completion rate of each of two or more portions of the nozzle group N(1) separated in a direction in which the nozzles are arranged in each nozzle row is equal to or smaller than the image completion rate of another nozzle group N(2) or N(3)

In the example of FIG. 11, the image completion rate of the four concave portions P9 of the nozzle group N(1) separated in the direction in which the nozzles are arranged in each nozzle row is 0%, which is smaller than the minimum image completion rate 40% of the nozzle group N(2), which is realized at portions between the convex portions P10, and smaller than the image completion rate of 50% of the nozzle group N(3), so as to satisfy the above eighth characteristic. According to the eighth characteristic, multiple portions, i.e., the concave portions P9, having the minimum image completion rate, are formed in an image area of the nozzle group N(1), and an interval is provided in-between each adjacent concave portion pair P9 to an extent such that the coalescence of dots may not occur. In other words, providing the peak value and the bottom value for the image completion rates so that the coalescence of dots may not occur in the nozzle group N(1). Thus, the coalescence of dots can more reliably be prevented.

The distribution graph G4 in FIG. 11 also satisfies the above first, second, and third characteristics.

In the present embodiment, controlling the ink discharge amounts of the nozzle groups N(1), N(2), and N(3) based on the image completion rates allocated to the nozzle groups N(1), N(2), and N(3) illustrated in the distribution graphs G1, G2, G3, and G4 of FIGS. 7, 9, 10, and 11, respectively, allows preventing the occurrence of both of two types of coalescence of dots described with reference to FIGS. 5 and 6. Accordingly, the coalescence of dots can be prevented more reliably. When the coalescence of dots is prevented, the resolution of an image to be formed is increased, and the color reproduction range is also expanded. In addition, the permeation of pigments into the recording medium 40 is also reduced. Thus, the deinking property of the recording medium 40 is also enhanced.

Note that in the distribution graphs G1, G2, G3, and G4 illustrated in FIGS. 7, 9, 10, and 11, respectively, that indicate the image completion rates allocated to the nozzle groups N(1), N(2), and N(3), the image completion rate of the nozzle group N(3) is evenly 50% in the medium conveyance direction A and the distribution of the image completion rates is set such that the sum of the image completion rates of the nozzle groups N(1) and N(2) is 50% evenly in the medium conveyance direction A. However, the distribution of the image completion rates may be set differently as long as the distribution of the image completion rates may satisfy at least a part of the above-described first, second, third, fourth, fifth, sixth, seventh, and eighth characteristics. In other words, it is only necessary to gradually increase the adhesion amount of ink and to reduce the adhesion amount of the nozzle group N(1) as less as possible to prevent the coalescence of dots, when an image is formed in the order of the nozzle groups N(1), N(2), and N(3), to complete the image.

For example, the distribution of the image completion rates may be such that the image completion rate of the nozzle group N(3) is greater than 50% and the sum of the image completion rates of the nozzle group N(1) and the nozzle group N(2) is less than 50%. For example, the nozzle group N(1) is 10%, the nozzle group N(2) is 20%, and the nozzle group N(3) is 70%. In this case, compared to the examples of FIGS. 7, 9, 10, and 11, the number of dots to be discharged first is relatively small. For this reason, the influence of coalescence of dots can be reduced. On the other hand, the image completion rate of the nozzle group N(3) to discharge last is high. Accordingly, the ratio at which the quality of the nozzle group N(3) affects the final quality of the completed image is large.

Further, the distribution of the image completion rates may be such that the image completion rate of the nozzle group N(3) is smaller than 50% and the sum of the image completion rates of the nozzle groups N(1) and N(2) is larger than 50% (for example, N(1) is 25%, N(2) is 35%, and N(3) is 40%). In this case, compared to the examples of FIGS. 7, 9, 10, 11, the number of dots to be printed first is relatively slightly large. For this reason, the effect of preventing the influence of the coalescence of dots is small. However, the image completion rates of the nozzle groups N(1), N(2), and N(3) are relatively close. Thus, the final quality of the completed image is stable.

In consideration of the above-described characteristics, for example, the image completion rates of the nozzle groups N(1), N(2), and N(3) may be set such that the nozzle group N(1) is 25%, the nozzle group N(2) is 35%, and the nozzle group N(3) is 40% when the compatibility (degree at which the coalescence of dots is likely to occur) between the printing target and the ink is favorable; and may be set such that the nozzle group N(1) is 10%, the nozzle group N(2) is 20%, and the nozzle group N(3) is 70% when the degree of coalescence of dots is poor.

Note that when the image completion rate of the nozzle group N(1) is set to be sufficiently small to prevent the coalescence of dots, the image completion rate of the nozzle group N(3) may be set to be smaller than the image completion rate of the nozzle group N(2). For example, the image completion rates of the nozzle groups N(1), N(2), and N(3) may be evenly set to 10%, 50%, and 40%, respectively.

Figure 12A:
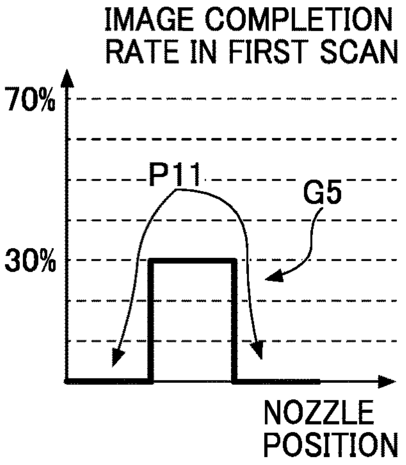
FIGS. 12A, 12B, 12C, 12D, 12E, 12F, and 12G are diagrams illustrating relations between distribution of image completion rates and masks, according to an embodiment of the present disclosure.
Figure 12B:
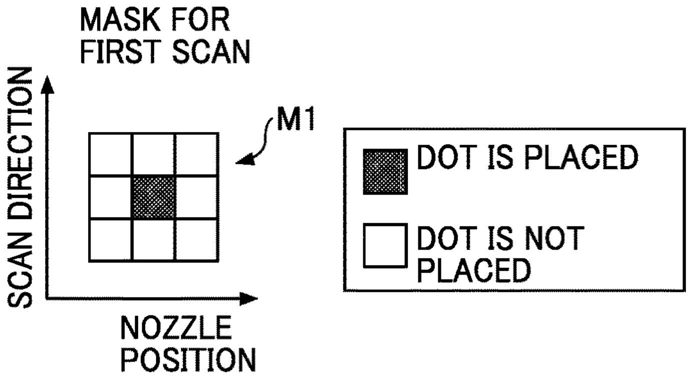
Figure 12C:
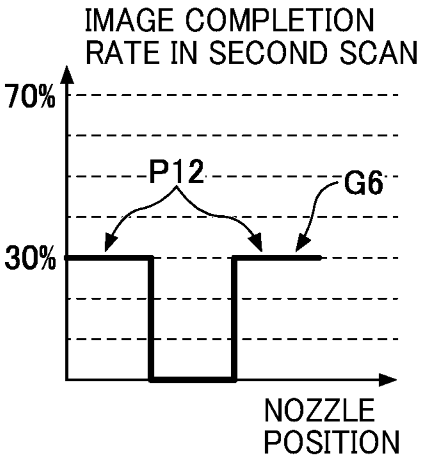
Figure 12D:
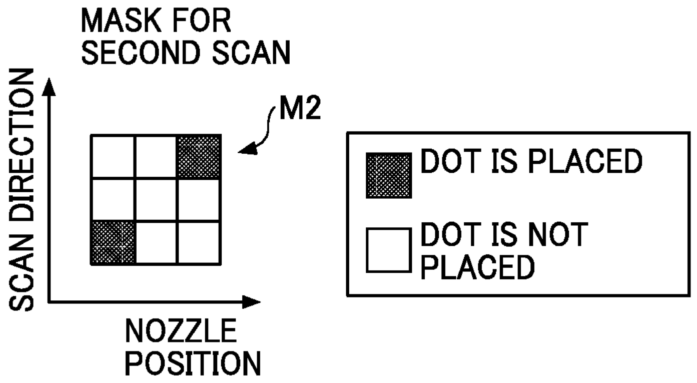
Figure 12E:
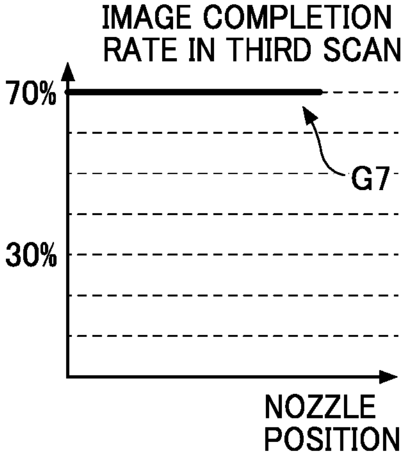
Figure 12F:
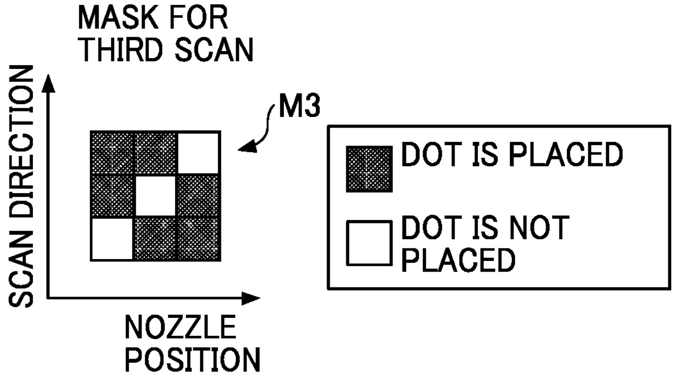
Figure 12G:
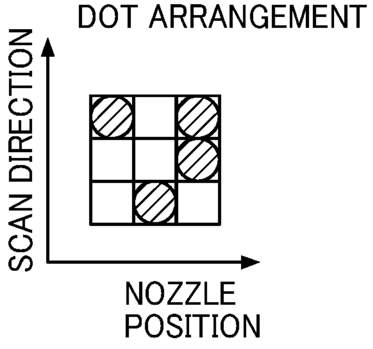
Figure 13:
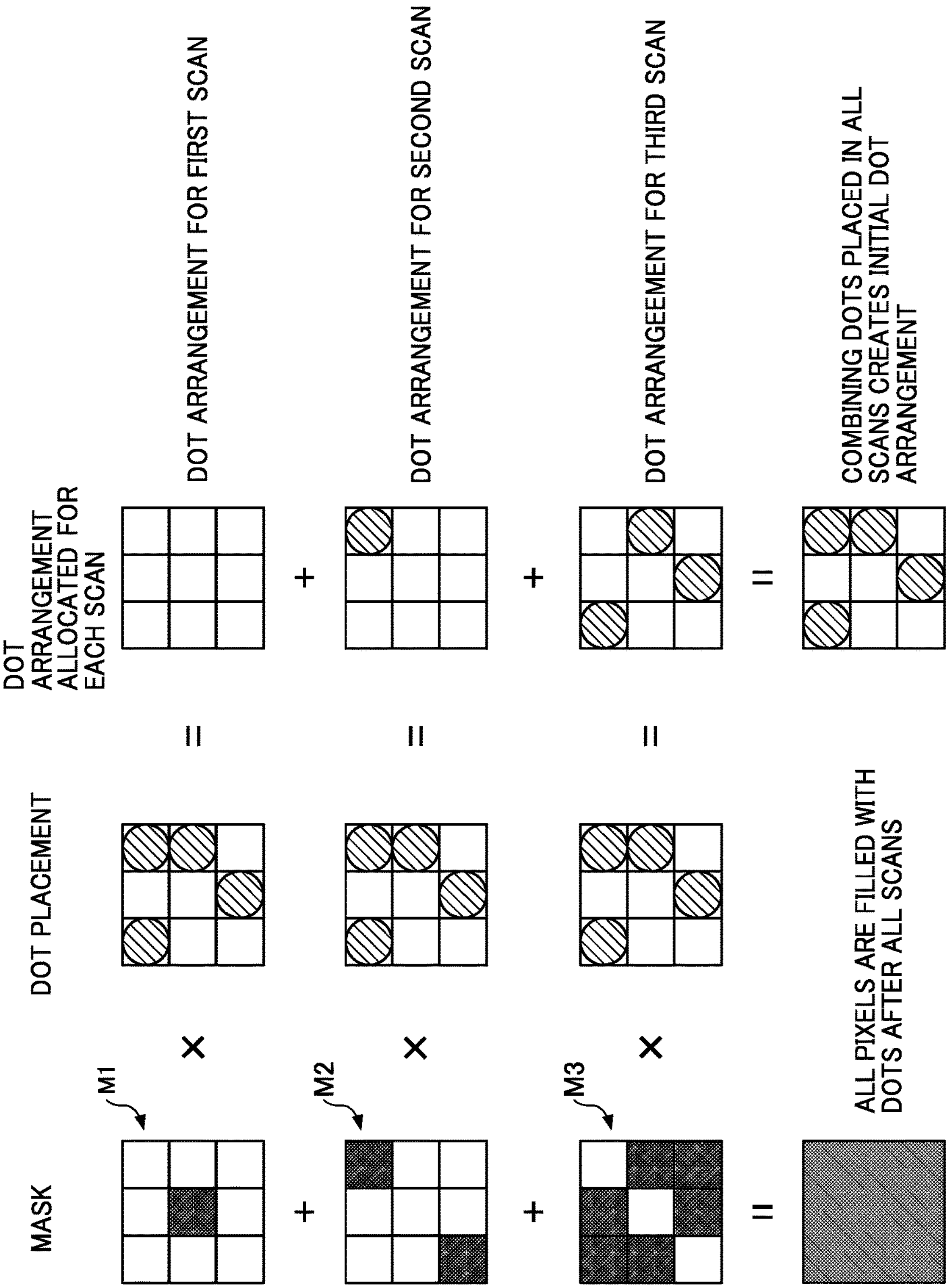
FIG. 13 is a diagram illustrating how dot arrangement is controlled by the masks illustrated in FIGS. 12A, 12B, 12C, 12D, 12E, 12F, and 12G, according to an embodiment of the present disclosure.

Next, with reference to FIGS. 12 and 13, a method in which the above-described distribution of the image completion rates is implemented is described. In the present embodiment, the ASIC 15 of the controller 10 applies masks to the output dot data and distributes the dot data to each of nozzle rows of the nozzle groups N(1), N(2), and N(3) to implement a desired distribution of the image completion rates.

Arrangement of dots is controlled using the mask to prevent an interference pattern, i.e., moiré pattern, caused by variations in dots arranged in each scan. Desirably, the mask is randomly applied to the arrangement of dots and unlikely to be visible. Examples of the method are given below.

FIGS. 12A, 12B, 12C, 12D, 12E, 12F, and 12G are diagrams illustrating the relation between the distribution of the image completion rates and the masks, according to the present embodiment. FIG. 13 is a diagram illustrating how dot arrangement is controlled by the masks illustrated in FIGS. 12A, 12B, 12C, 12D, 12E, 12F, and 12G, according to the present embodiment.

As illustrated in FIG. 12G, three dots in the scan direction, i.e., the main scanning direction, and three dots in the nozzle position, i.e., the medium conveyance direction A, are arranged in a case of a dot arrangement of a 3×3 grid. The output dot data is a pattern to be printed at four points on an upper left grid, an upper right grid, a middle right grid, and a lower center grid of the 3×3 grid when the scan direction is a vertical direction and the nozzle position direction is the horizontal direction.

As illustrated in FIG. 12A, in the distribution graph G5 indicating the image completion rate of the nozzle group N(1) in the first scan, two concave portions P11 are formed at a predetermined interval on upstream and downstream in the medium conveyance direction A. The image completion rate is 0% in the concave portions P11 and 30% in the portion between the concave portions P11. The image completion rate represents the proportion of dots generated in the scanning direction.

As illustrated in FIG. 12B, a mask M1 of the first scan for implementing a distribution graph G5 is formed such that a dot is placed only in a middle center grid of the 3×3 grid and the dot arrangement is OFF in other grids.

As illustrated in FIG. 12C, in a distribution graph G6 of the image completion rate of the nozzle group N(2) in the second scan, convex portions P12 are formed at positions corresponding to the concave portions P11 of the nozzle group N(1). The image completion rate is 30% in the convex portions P12 and 0% in the portion between the convex portions P12.

As illustrated in FIG. 12D, a mask M2 for the second scan for implementing the distribution graph G6 is formed such that a dot is placed in an upper right grid and a lower left grid of the 3×3 grid, and dots are not placed for other grids.

As illustrated in FIG. 12E, a distribution graph G7 indicating an image completion rate of the nozzle group N(3) in a third scan is evenly 70% in the medium conveyance direction A.

As illustrated in FIG. 12F, a mask M3 for the third scan for implementing a distribution graph G7 is formed such that a dot is placed for each of an upper left grid, an upper center grid, a middle left grid, a middle right grid, a lower center grid, and a lower right grid of the 3×3 grid, and the dot arrangement dots are not placed for other grids.

The masks M1, M2, and M3 are formed so as to satisfy the following three conditions 1, 2, and 3.

1. When the masks M1, M2, and M3 are combined, dot arrangement for all the grids of the 3×3 grid is ON to reproduce the dot arrangement at 100%.

2. The dot arrangement of dot is set to ON or OFF randomly for each of the masks M1, M2, and M3 to prevent moiré pattern.

3. Preferably, frequency characteristics of each of the masks M1, M2, and M3 are unlikely to be visible. For example, the masks M1, M2, and M3 may have blue noise characteristics.

When dot positions in each scan vary, dot patterns interfere with each other. Accordingly, an unintended pattern, as moiré pattern, may be generated in the completed dot arrangement. Preferably, the dot arrangement for the scan masks M1, M2, and M3 is set at random to reduce such an unintended pattern from being generated. The more randomly the dots are placed or not placed for the masks M1, M2, and M3, the interference pattern is less likely to be generated.

Preferably, the interference pattern is unlikely to be visually recognizable even if an interference pattern is generated. For this reason, preferably, the scan masks M1, M2, and M3 have characteristics such as blue noise characteristics in which there are few low-frequency components that are easily visually recognized and there are many high-frequency components that are difficult to visually be recognized.

Applying the masks M1, M2, and M3 to the dot arrangement pattern of FIG. 12G allows allocation of dot arrangements for the first, the second, and the third scans, as illustrated in FIG. 13. Accordingly, a same dot arrangement as the dot arrangement of F 12G is obtained when the dot arrangements of all scans are combined. Forming the masks M1, M2, and M3 used in each scan so as to satisfy the above-described conditions can prevent interference between dot patterns output in each scan. Accordingly, occurrence of an unintended pattern, as moiré pattern, in a completed dot arrangement can be prevented.

Figure 14A:
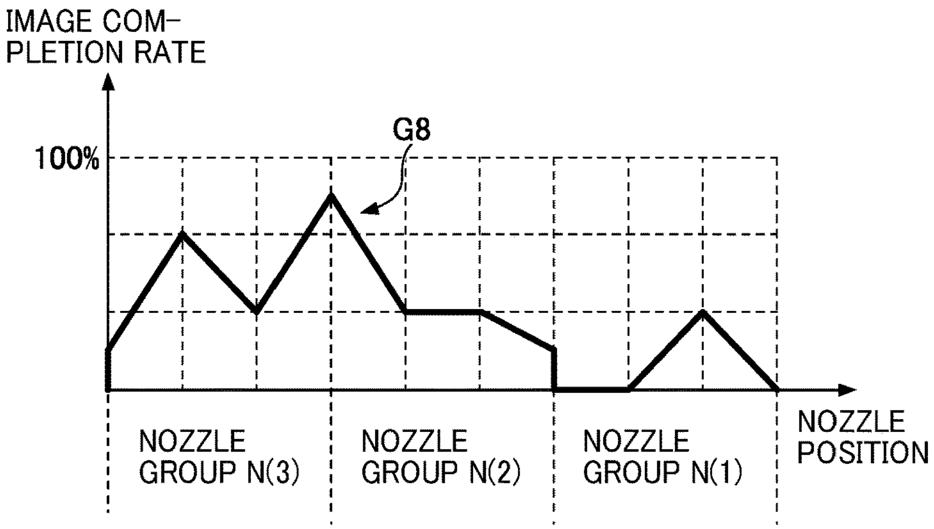
FIGS. 14A, 14B, and 14C are diagrams illustrating shape patterns indicating image completion rates, according to an embodiment of the present disclosure.
Figure 14B:
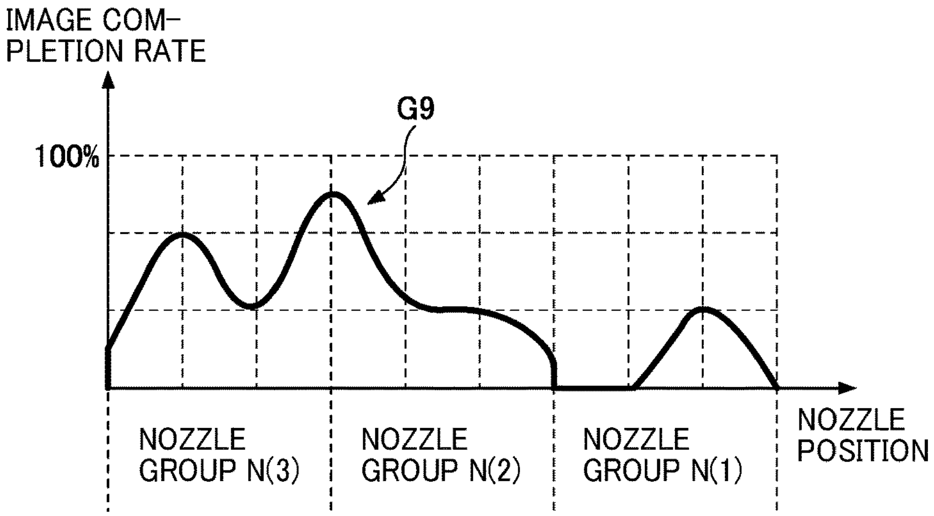
Figure 14C:
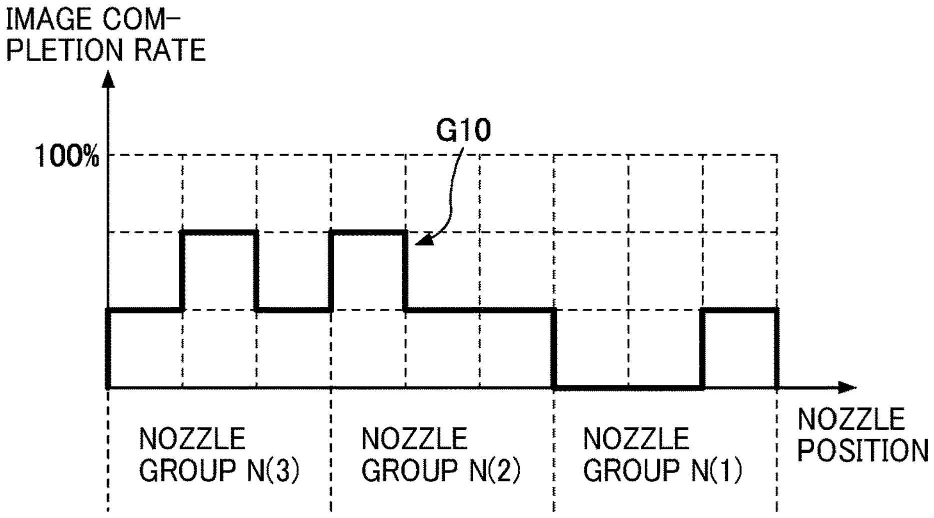

FIGS. 14A, 14B, and 14C are diagrams illustrating shape patterns indicating the image completion rates of the nozzle groups N(1), N(2), and N(3), according to the present embodiment. A shape pattern constituted by straight lines, such as the distribution graph G8 illustrated in FIG. 14A, has been illustrated in the above-described embodiments. However, the present disclosure is not limited to such a shape pattern.

For example, as in a distribution graph G9 illustrated in FIG. 14B, a shape pattern formed by curves may be used. When a curved shape is adopted, the number of generated dots changes smoothly. Accordingly, the degree of coalescence of dots becomes smooth and the deterioration of image quality can be prevented.

In addition, as in a distribution graph G10 illustrated in FIG. 14C, a shape pattern that combines squares may be used, when the number of nozzles in each of the nozzle groups N(1), N(2), and N(3) is small.

As the image forming apparatus of the present disclosure, any medium or material can be used as a printing target as long as a significant image such as a character or a figure can be visualized by the discharged liquid.

The medium to be printed is a recording medium such as paper, recording paper, recording sheet of paper, film, or cloth, an electronic substrate, an electronic component such as a piezoelectric element, a powder layer, an organ model, or an inspection cell, and includes all media to which a liquid adheres unless particularly limited. The material of the medium may be paper, thread, fiber, cloth, leather, metal, plastic, glass, wood, ceramics, as long as the liquid can adhere thereto even temporarily.

The embodiments of the present disclosure have been described above with reference to specific examples. However, the present disclosure is not limited to these specific examples. Those in which a person skilled in the art appropriately adds design modifications to these specific examples are also included in the scope of the present disclosure as long as they have the characteristics of the present disclosure. Each element included in each specific example described above and the arrangement, condition, shape, for example, thereof are not limited to those illustrated, and can be appropriately changed. Combinations of the elements included in the specific examples described above can be appropriately changed as long as no technical contradiction occurs.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

a liquid discharge device including a first nozzle group to an N-th nozzle group, where N represents an integer, each nozzle group including at least one nozzle row in which a plurality of nozzle orifices to discharge liquid of at least one type of process color for image formation is arranged in a sub-scanning direction orthogonal to a main scanning direction, the first nozzle group being arranged most upstream of the first nozzle group to the N-th nozzle group in the sub-scanning direction, a second nozzle group to the N-th nozzle group being arranged downstream from the first nozzle group in order in the sub-scanning direction such that the first nozzle group to the N-th nozzle group do not overlap with each other when viewed from the main scanning direction; and processing circuitry configured to: during movement of the first nozzle group to the N-th nozzle group in the main scanning direction to form an image, cause the first nozzle group to discharge the liquid in a first scan;

cause the second nozzle group adjacent to the first nozzle group to discharge the liquid in a second scan after the first scan; and cause the N-th nozzle group adjacent to an (N−1)-th nozzle group to discharge the liquid in an N-th scan after the second scan to form a complete image in a predetermined image area of a recording medium after the N-th scan, wherein the processing circuitry is configured to, with respect to an image completion rate indicating a rate of an image formed by each of the first nozzle group to the N-th nozzle group in the complete image, set the image completion rate of a portion of the first nozzle group adjacent to the second nozzle group in the sub-scanning direction to be equal to or smaller than the image completion rate of any one of the second nozzle group to the N-th nozzle group.

2. The image forming apparatus according to claim 1, wherein the processing circuitry is configured to set the image completion rate of a portion of the first nozzle group adjacent to the predetermined image area of the recording medium to be equal to or smaller than the image completion rate of any one of the second nozzle group to the N-th nozzle group.

3. The image forming apparatus according to claim 1, wherein the processing circuitry is configured to set the image completion rate to decrease from a position with a maximum value of the image completion rate of the first nozzle group toward the portion of the first nozzle group adjacent to the second nozzle group.

4. The image forming apparatus according to claim 3, wherein the processing circuitry is configured to:

set the image completion rate of a portion of the first nozzle group adjacent to the predetermined image area of the recording medium to be equal to or smaller than the image completion rate of any one of the second nozzle group to the N-th nozzle group; and set the image completion rate to decrease from the position with the maximum value of the image completion rate of the first nozzle group toward the portion of the first nozzle group adjacent to the predetermined image area of the recording medium.

5. The image forming apparatus according to claim 1, wherein the processing circuitry is configured to:

set the image completion rate of at least a portion of the first nozzle group to be equal to or smaller than the image completion rate of any one of the second nozzle group to the N-th nozzle group; and set a minimum value of the image completion rate of a p-th nozzle group to be equal to or smaller than a minimum value of the image completion rate of a (p+1)-th nozzle group, where p represents an integer.

6. The image forming apparatus according to claim 1, wherein the processing circuitry is configured to set the image completion rate of each of two or more portions of the first nozzle group separated in the sub-scanning direction to be equal to or smaller than the image completion rate of any one of the second nozzle group to the N-th nozzle group.

7. The image forming apparatus according to claim 1, wherein the processing circuitry is configured to apply a mask to output dot data and distribute the output dot data to each of the first nozzle row to the N-th nozzle row to allocate the image completion rate to each of the first nozzle group to the N-th nozzle group.

8. An image forming apparatus comprising:

a liquid discharge device including a first nozzle group to an N-th nozzle group, where N represents an integer, each nozzle group including at least one nozzle row in which a plurality of nozzle orifices to discharge liquid of at least one type of process color for image formation is arranged in a sub-scanning direction orthogonal to a main scanning direction, the first nozzle group being arranged most upstream of the first nozzle group to the N-th nozzle group in the sub-scanning direction, a second nozzle group to the N-th nozzle group being arranged downstream from the first nozzle group in order in the sub-scanning direction such that the first nozzle group to the N-th nozzle group do not overlap with each other when viewed from the main scanning direction; and processing circuitry configured to: during movement of the first nozzle group to the N-th nozzle group in the main scanning direction to form an image, cause the first nozzle group to discharge the liquid in a first scan;

cause the second nozzle group adjacent to the first nozzle group to discharge the liquid in a second scan after the first scan; and cause the N-th nozzle group adjacent to an (N−1)-th nozzle group to discharge the liquid in an N-th scan after the second scan, to form a complete image in a predetermined image area of a recording medium, wherein the processing circuitry is configured, with respect to an image completion rate indicating a rate of an image formed by each of the first nozzle group to the N-th nozzle group in the complete image, to set the image completion rate of a portion of the first nozzle group adjacent to the predetermined image area of the recording medium in the sub-scanning direction to be equal to or smaller than the image completion rate of any one of the second nozzle group to the N-th nozzle group.

9. The image forming apparatus according to claim 8, wherein the processing circuitry is configured to set the image completion rate to decrease from a position with a maximum value of the image completion rate of the first nozzle group toward the portion of the first nozzle group adjacent to the predetermined image area of the recording medium.

10. An image forming method comprising:

forming an image with a liquid discharge device including a first nozzle group to an N-th nozzle group, where N is an integer, each nozzle group including at least one nozzle row in which a plurality of nozzle orifices to discharge liquid of at least one type of process color for image formation are arranged in a sub-scanning direction orthogonal to a main scanning direction, the first nozzle group being arranged most upstream of the first nozzle group to the N-th nozzle group in the sub-scanning direction, a second nozzle group to the N-th nozzle group being arranged downstream from the first nozzle group in order in the sub-scanning direction such that the first nozzle group to the N-th nozzle group do not overlap with each other when viewed from the main scanning direction; and moving the first nozzle group to the N-th nozzle group in the main scanning direction to form an image;

discharging the liquid from the first nozzle group in a first scan;

discharging the liquid from the second nozzle group adjacent to the first nozzle group after the first scan;

discharging the liquid from the N-th nozzle group adjacent to an (N−1)-th nozzle group in an N-th scan after the second scan to form a complete image in a predetermined image area of a recording medium after the N-th scan; and with respect to an image completion rate indicating a rate of an image formed by each of the first nozzle group to the N-th nozzle group in the complete image, setting the image completion rate of a portion of the first nozzle group adjacent to the second nozzle group in the sub-scanning direction to be equal to or smaller than the image completion rate of any one of the second nozzle group to the N-th nozzle group.

11. The image forming method according to claim 10, wherein the setting includes setting the image completion rate of a portion of the first nozzle group adjacent to the predetermined image area of the recording medium to be equal to or smaller than the image completion rate of any one of the second nozzle group to the N-th nozzle group.

12. The image forming method according to claim 10, wherein the setting includes setting the image completion rate of at least a portion of the first nozzle group to be equal to or smaller than the image completion rate of any one of the second nozzle group to the N-th nozzle group, and wherein the setting includes setting a minimum value of the image completion rate of a p-th nozzle group to be equal to or smaller than a minimum value of the image completion rate of a (p+1)-th nozzle group, where p represents an integer.

13. The image forming method according to claim 10, wherein the setting includes setting the image completion rate of each of two or more portions of the first nozzle group separated in the sub-scanning direction to be equal to or smaller than the image completion rate of any one of the second nozzle group to the N-th nozzle group.

* * * * *